(12) United States Patent
Bogner et al.

(10) Patent No.: US 6,626,120 B2
(45) Date of Patent: Sep. 30, 2003

(54) PRECISION AIR PLANTER FOR PLOT PLANTING

(76) Inventors: Jim Bogner, 6807 S. Willison Rd., Burrton, KS (US) 67019; Ross Larson, 305 Larson Ave., Story City, IA (US) 50248; Anthony Van Allen, 704 Ninth St., Novada, IA (US) 50201

(*) Notice: Subject to any disclaimer, the term of this patent is extended or adjusted under 35 U.S.C. 154(b) by 1 day.

(21) Appl. No.: 10/010,040

(22) Filed: Dec. 6, 2001

(65) Prior Publication Data

US 2002/0170476 A1 Nov. 21, 2002

Related U.S. Application Data

(60) Provisional application No. 60/251,978, filed on Dec. 6, 2000.

(51) Int. Cl.$^7$ ............................................... A01C 7/00
(52) U.S. Cl. ................................... 111/185; 221/211
(58) Field of Search .......................... 111/185, 184, 111/183, 177, 170, 77; 221/211, 210, 277, 278

(56) References Cited

U.S. PATENT DOCUMENTS

| | | | |
|---|---|---|---|
| 4,135,457 A | | 1/1979 | Willis |
| 4,450,979 A | * | 5/1984 | Deckler ...................... 221/263 |
| 4,688,698 A | | 8/1987 | Holland |
| 4,924,786 A | | 5/1990 | Keeton |
| 5,027,725 A | * | 7/1991 | Keeton ...................... 111/184 |
| 5,058,766 A | | 10/1991 | Deckler |
| 5,170,730 A | | 12/1992 | Swallow |
| 5,170,909 A | * | 12/1992 | Lundie et al. ............... 221/211 |
| 5,392,707 A | * | 2/1995 | Romans ....................... 111/185 |
| 5,542,364 A | * | 8/1996 | Romans ....................... 111/185 |
| 5,799,598 A | * | 9/1998 | Stufflebeam et al. ........ 111/185 |
| 6,044,779 A | * | 4/2000 | Brown et al. ................ 111/185 |
| 6,247,418 B1 | * | 6/2001 | Dunham ....................... 111/185 |
| 6,283,051 B1 | * | 9/2001 | Yoss ........................... 111/185 |

FOREIGN PATENT DOCUMENTS

| | | | |
|---|---|---|---|
| EP | 0140699 | * | 5/1985 |
| EP | 0141638 | * | 5/1985 |

OTHER PUBLICATIONS

"2000 Series Planters" catalog, Kinze Manufacturing, Inc. (Rev. 7–98).
"Universal Planter" brochure, Heath Farm Equipment (undated).
"Specialized Agricultural Equipment" catalog, Almaco (undated).
"Plot Seeders" catalog, Wintersteiger (undated).
"Precision Spaced Planters", Wintersteiger (undated).
"Dual Disc: Our Precision–Spaced Planter Takes Off" advertisement, Wintersteiger (undated).

\* cited by examiner

*Primary Examiner*—Victor Batson
(74) *Attorney, Agent, or Firm*—Chase Law Firm, L.C.

(57) ABSTRACT

A precision air planter for plot planting includes a metering unit with separate seed systems which may be selectively activated to allow alternately planting various seed types from one plot to the next. A rotary encoder provides location information which is used by a microprocessor to calibrate the system, control seed planting and spacing, control plot length and spacing and record data related to the planted plots.

4 Claims, 39 Drawing Sheets

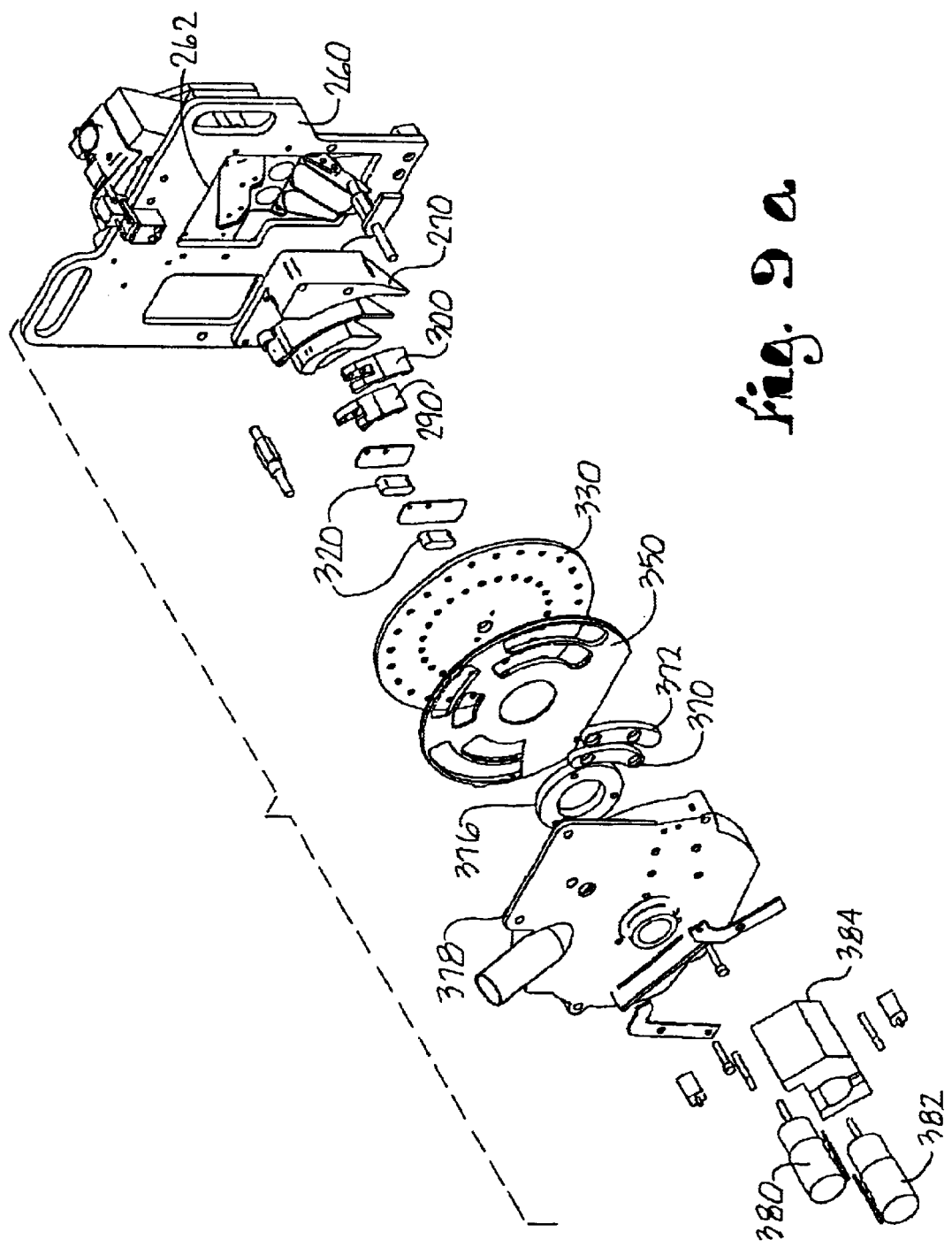

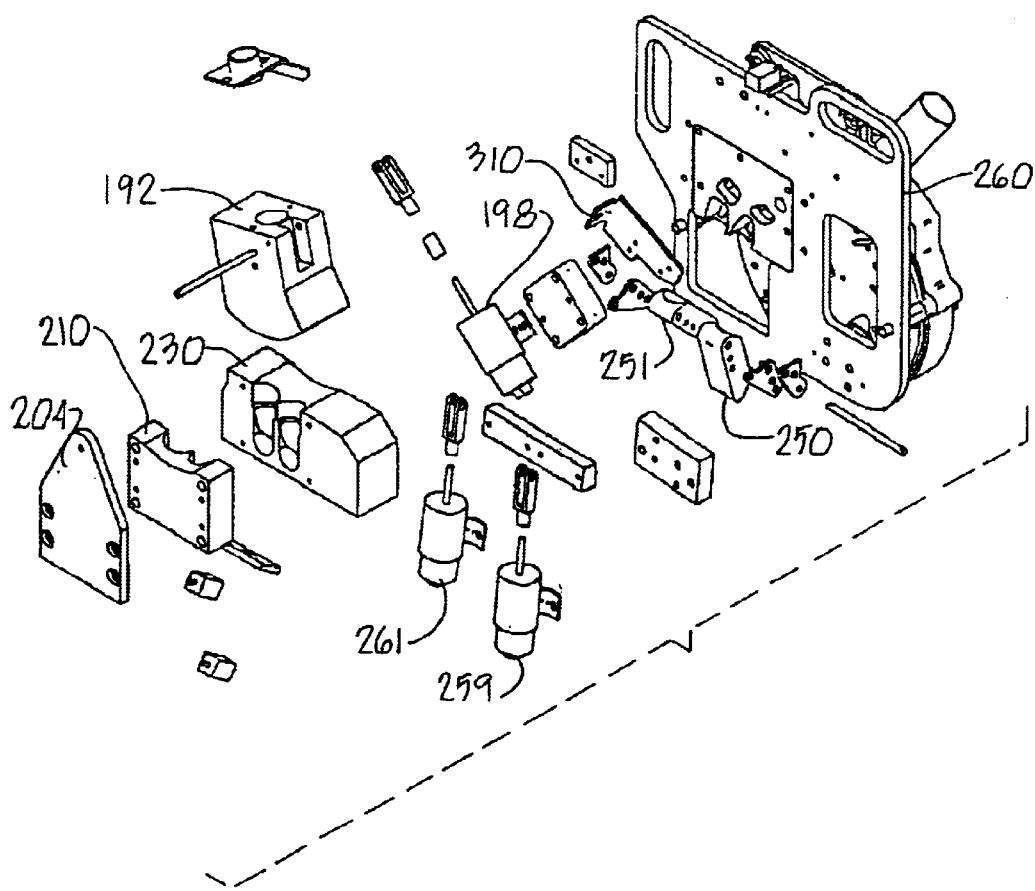

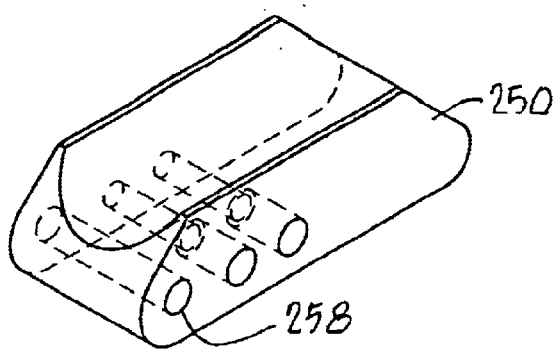
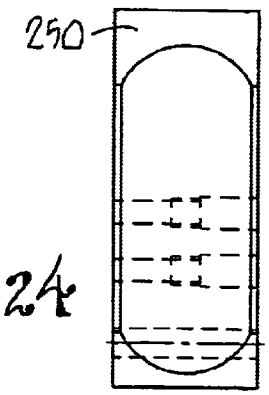
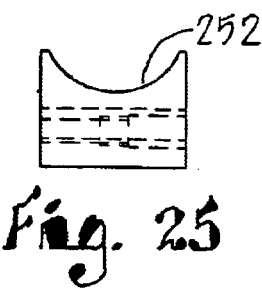
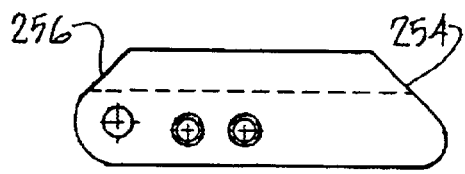
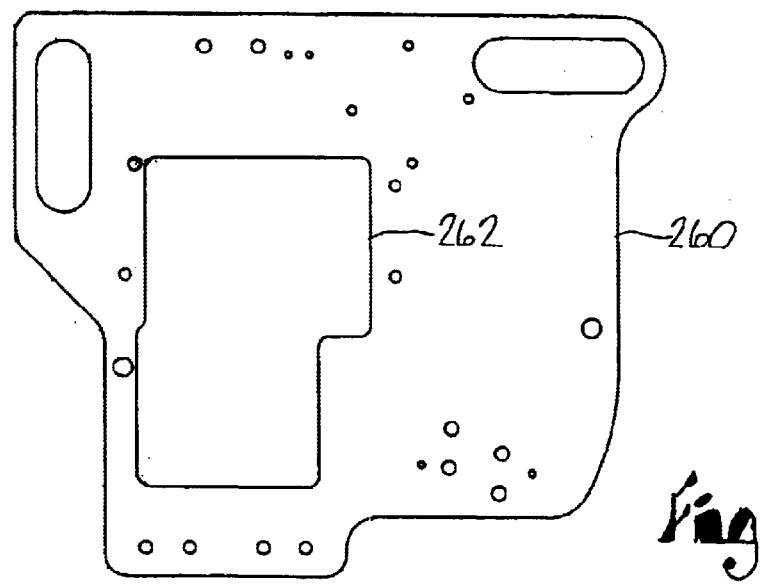

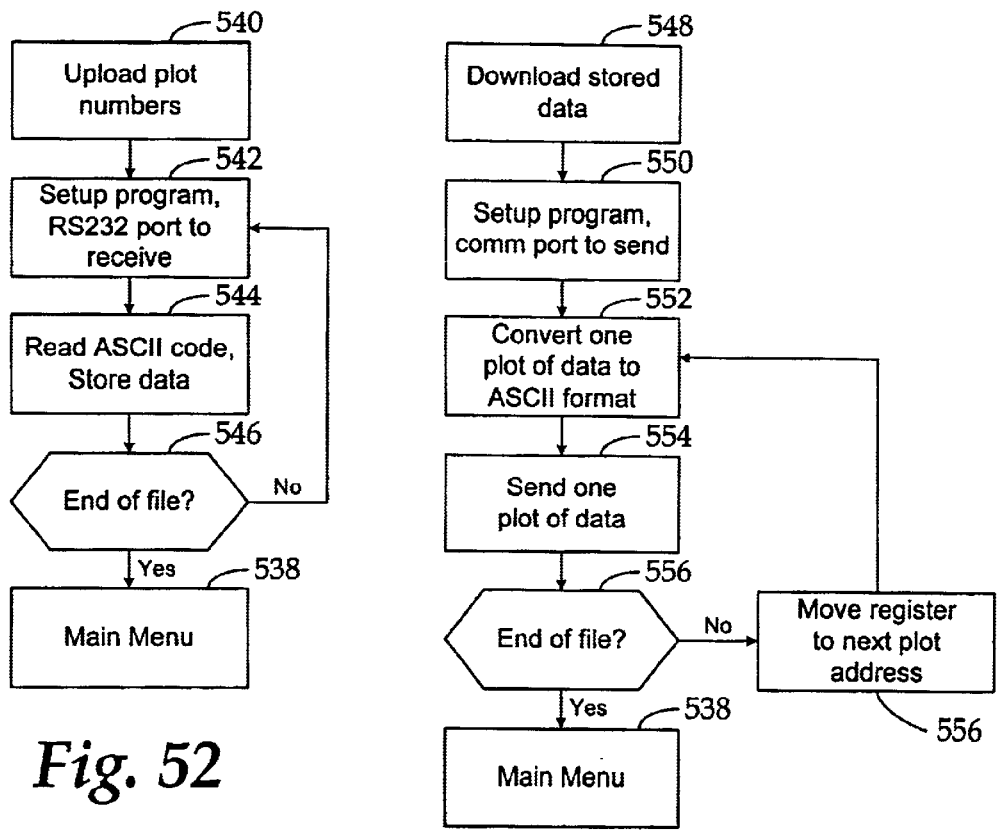
*Fig. 52*
*Fig. 53*
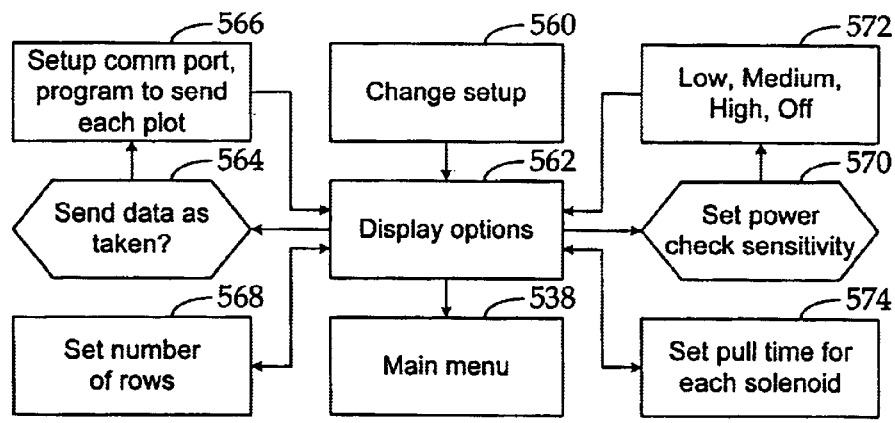
*Fig. 54*

PRECISION AIR PLANTER FOR PLOT PLANTING

CROSS-REFERENCE TO RELATED APPLICATION

This application claims the benefit of the prior filed, application Serial No. 60/251,978, filed Dec. 6, 2000, entitled PRECISION AIR PLANTER FOR PLOT PLANTING.

BACKGROUND OF THE INVENTION

The use of seed planters for agricultural purposes is well known. Seed planters are typically used to plant a row or entire field of a single type of seed. In research applications, it may be necessary to plant seeds of different types within the same field in plots of the same seed type. In the research environment, it is often necessary to precisely record the number of seeds planted and the location of each seed. It is necessary to separate different types of seed to avoid cross contamination. From plot to plot the seeds must be cleaned out and the next type of seed loaded in the planter for the next plot.

Another problem with prior art planters is the calibration of the planter is done once at the beginning of the day and then allowed to drift. By the end of the day, the spacing of the planted seeds may be significantly different than the spacing at the beginning of the day.

SUMMARY OF THE INVENTION

A primary object of the present invention is to provide an air planter having multiple seed systems on one plate.

Another important object of the present invention is to provide an air planter as aforesaid which separates the seed systems on the seed plate to ensure no cross-contamination between the seeds.

Still another object of the present invention is to provide an air planter as aforesaid having independently controlled vacuum cutoff to the seed plate in order to control the start and stop of the plots.

Yet another object of the present invention is to provide an air planter as aforesaid that allows the seed to be in contact with the seed plate or positioned very close to the seed plate while the seed is waiting for the start of the plot.

Still another object of the present invention is to provide an air planter with multiple seed systems on one plate having separated agitation grooves or ribs for seed agitation.

Another important object of the present invention is to provide an air planter that is computer controlled and monitored to ensure proper seed flow.

Yet another important object of the present invention is to provide an air planter as aforesaid in which all user configured variables may be input to the computer.

Still another important object of the present invention is to provide an air planter as aforesaid which calibrates itself continuously while operating by checking its calculated position against a known location such as a check cable ball, a GPS signal, a laser positioning system, an ultrasonic signal, an infrared signal, or a pre-measured and pre-marked field.

Yet another important object of the present invention is to provide an air planter as aforesaid that suppresses error checking functions at non-critical times such as between passes while the planter is turning around and not planting and re-enables error checking automatically before the start of the next planting pass.

Another important object of the present invention is to provide an air planter as aforesaid which senses the seed on the plate before it enters the seed tube to provide more accurate seed counts.

Still another important object of the present invention is to provide an air planter as aforesaid in which the signal from the seed sensor in the drop tube is filtered and made into a consistent signal before being sent to the computer and analyzed as a seed to be counted and not mistaken as debris.

Yet another important object of the present invention is to provide an air planter as aforesaid which includes a pressurized seed tube to limit dust in the seed tube to help ensure more accurate seed counts.

Other objects and advantages of this invention will become apparent from the following description taken in connection with the accompanying drawings wherein is set forth by way of illustration and example, an embodiment of this invention.

BRIEF DESCRIPTION OF THE DRAWINGS

FIG. 7 shows the cable guide.

FIG. 9a is a front perspective exploded drawing of FIG. 8a.

FIG. 9b is a rear perspective exploded drawing of FIG. 8b.

FIG. 23 is a perspective view of the inner seed sump.

FIG. 24 is a front elevational view of the inner seed sump of FIG. 23.

FIG. 25 is a top view of the seed sump of FIG. 23.

FIG. 26 is a side elevational view of the seed sump of FIG. 23.

FIG. 27 is a front elevational view of the cover plate.

FIG. 52 is the upload plot numbers PLC software flow chart.

FIG. 53 is the download stored data PLC software flow chart.

FIG. 54 is the change setup software flow chart.

DESCRIPTION OF THE PREFERRED EMBODIMENT

Figure 1:
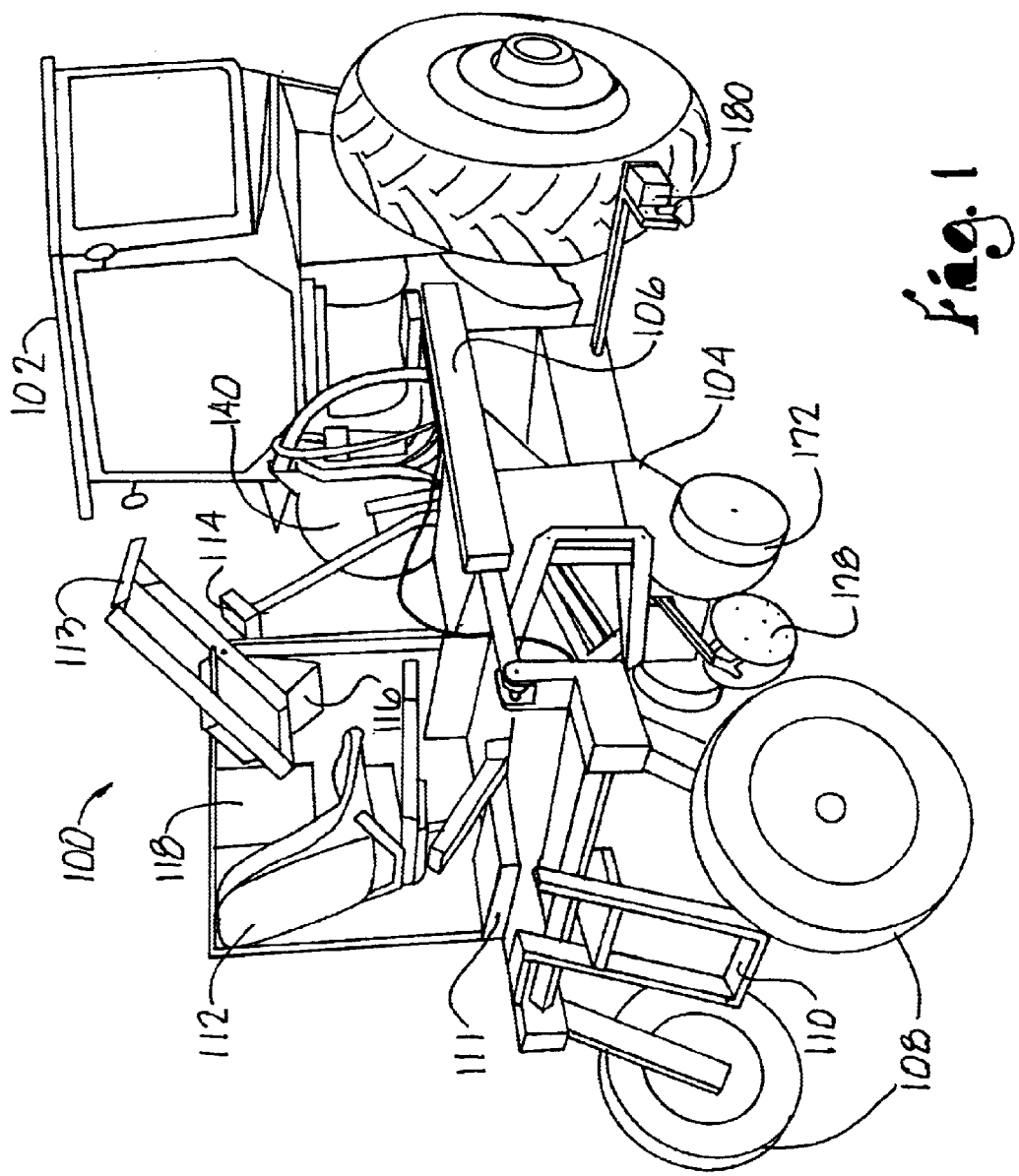
FIG. 1 is a diagram illustrating the air planter of the present invention coupled to a tractor.
Figure 5:
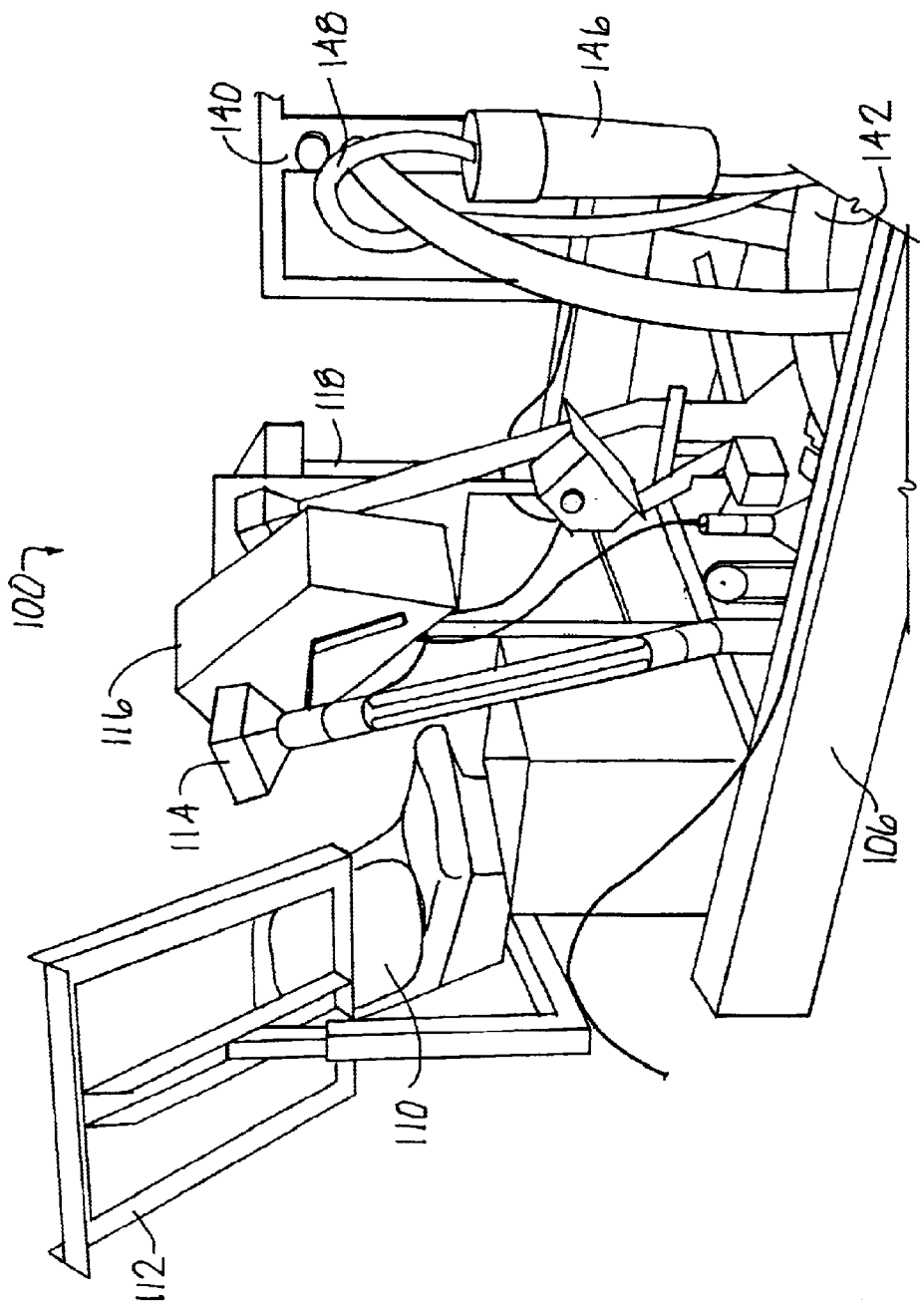
FIG. 5 is a perspective of the air planter looking rearwardly.

Turning more particularly to the drawings, FIGS. 1 and 5 show a vacuum planter 100 of the present invention which is pulled behind tractor 102. Vacuum planter 100 may plant one to four rows or more rows simultaneously. Planter 100 uses a conventional planter frame 104 such as a Kinze Row Unit.

A support frame 106 is secured to frame 104 and extends rearwardly to support wheels 108. Ladder 110 extends upwardly to operator platform 111. Operator seat 112 is positioned beside seed support rack 113, in front of seed drop tubes 114 and console touch screen 116. Operator console 116 provides the operator input and control of the programmable logic controller ("PLC") housed in cabinet 118 and discussed in detail below.

Figure 2:
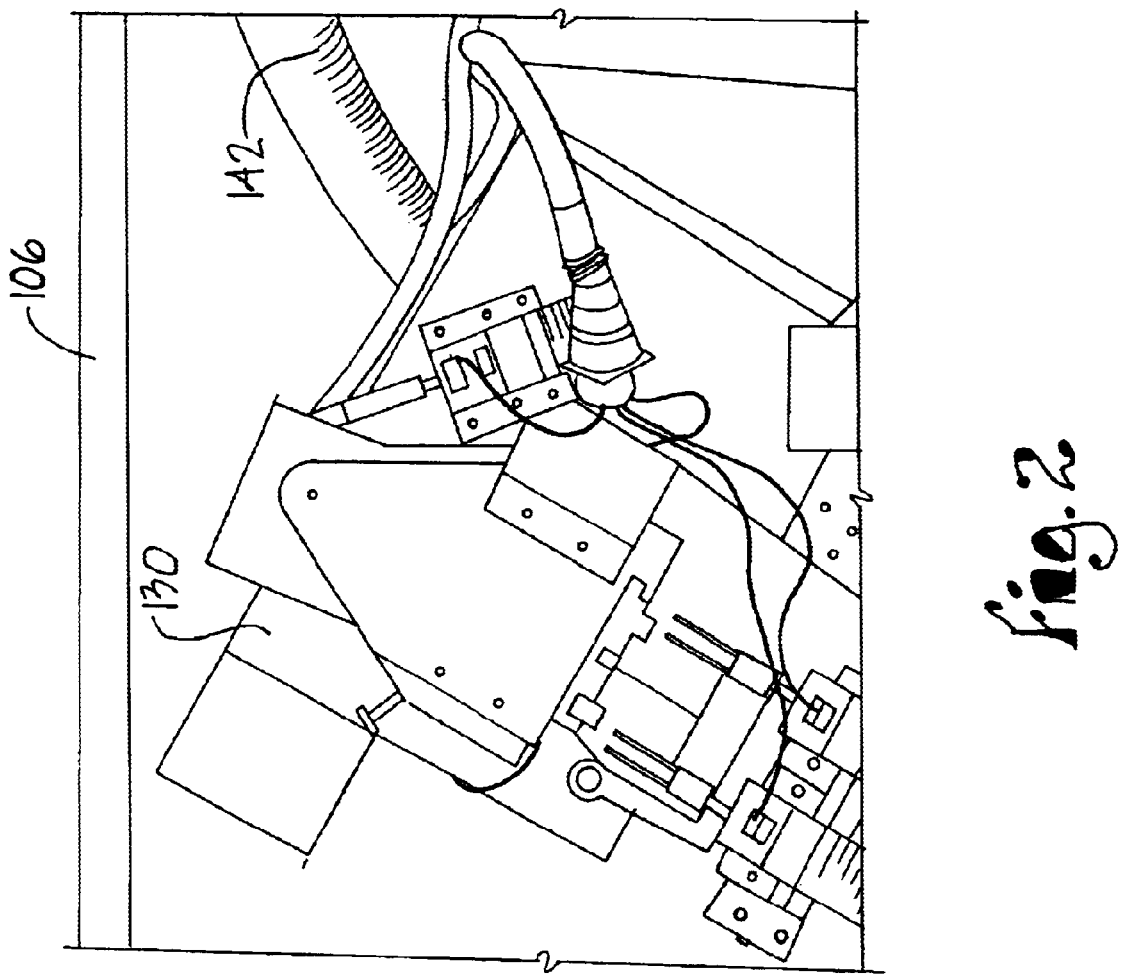
FIG. 2 is a side view of the planter showing the metering unit.
Figure 3:
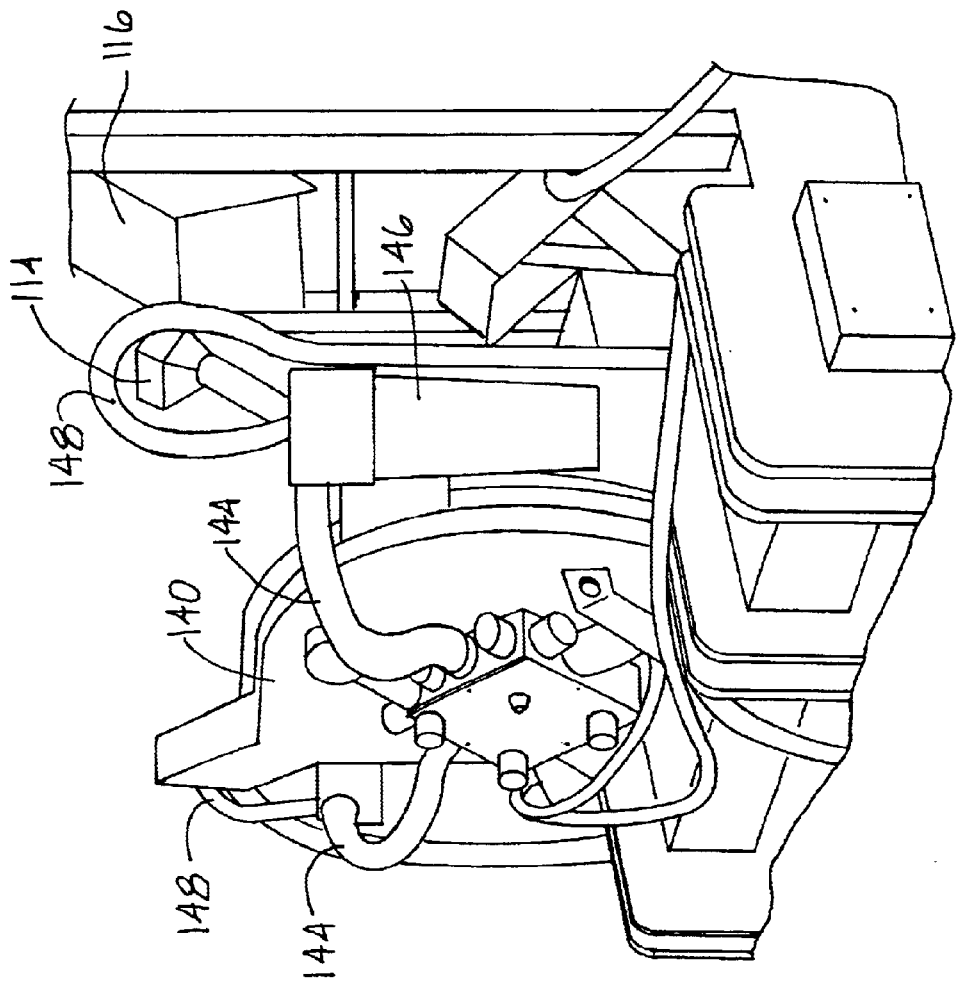
FIG. 3 is a perspective view of the vacuum unit.
Figure 4:
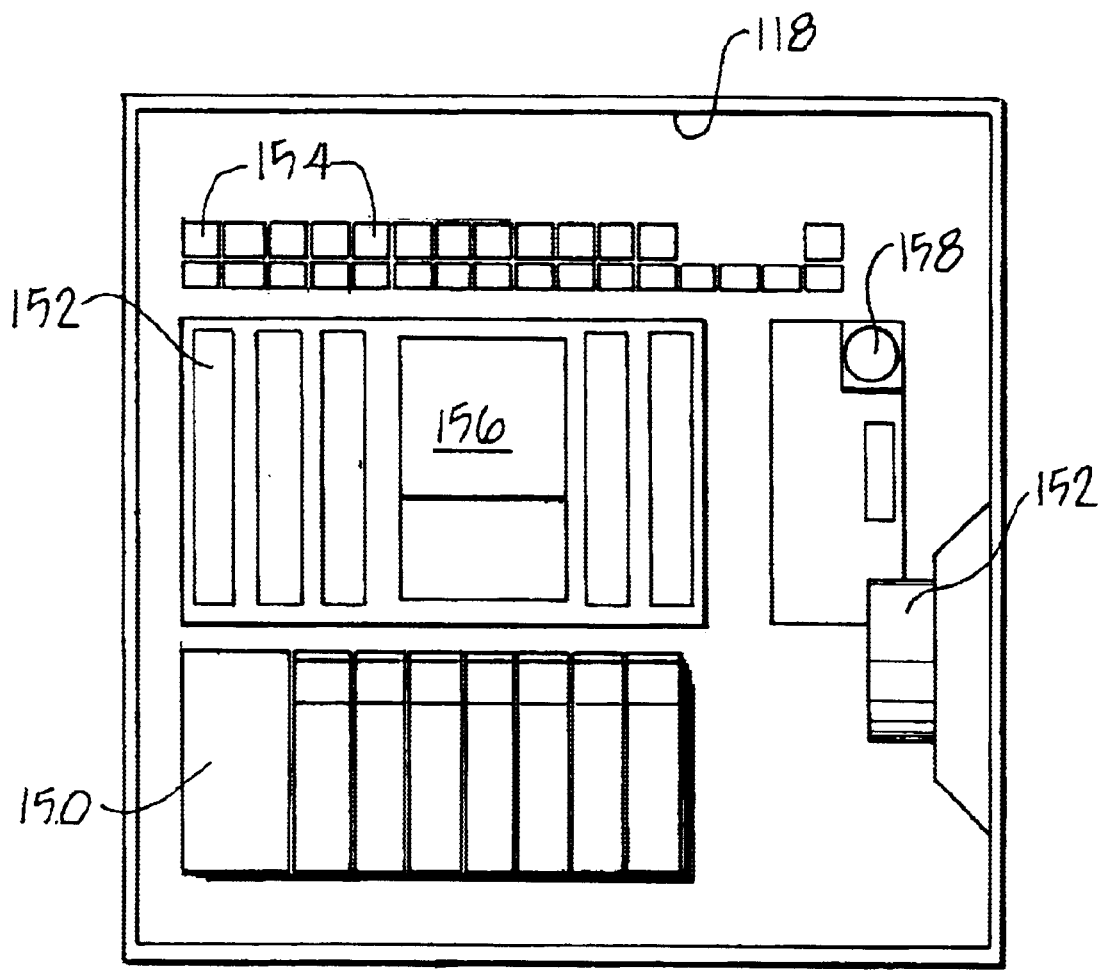
FIG. 4 shows the inside of the programmable logic controller (PLC) enclosure showing the PLC, the I/O interface, the power transformers, and the level detection circuit.

Referring to FIGS. 2 and 3, metering unit 130 is mounted to frame 104 below frame 106. Vacuum unit 140 is connected through vacuum line 142 to metering unit 130 to provide the vacuum for seed pick up, described below. Vacuum lines 144 provide a vacuum to seed discard jar 146 to collect discarded seeds from metering unit 130 through vacuum tube 148.

Figure 6:
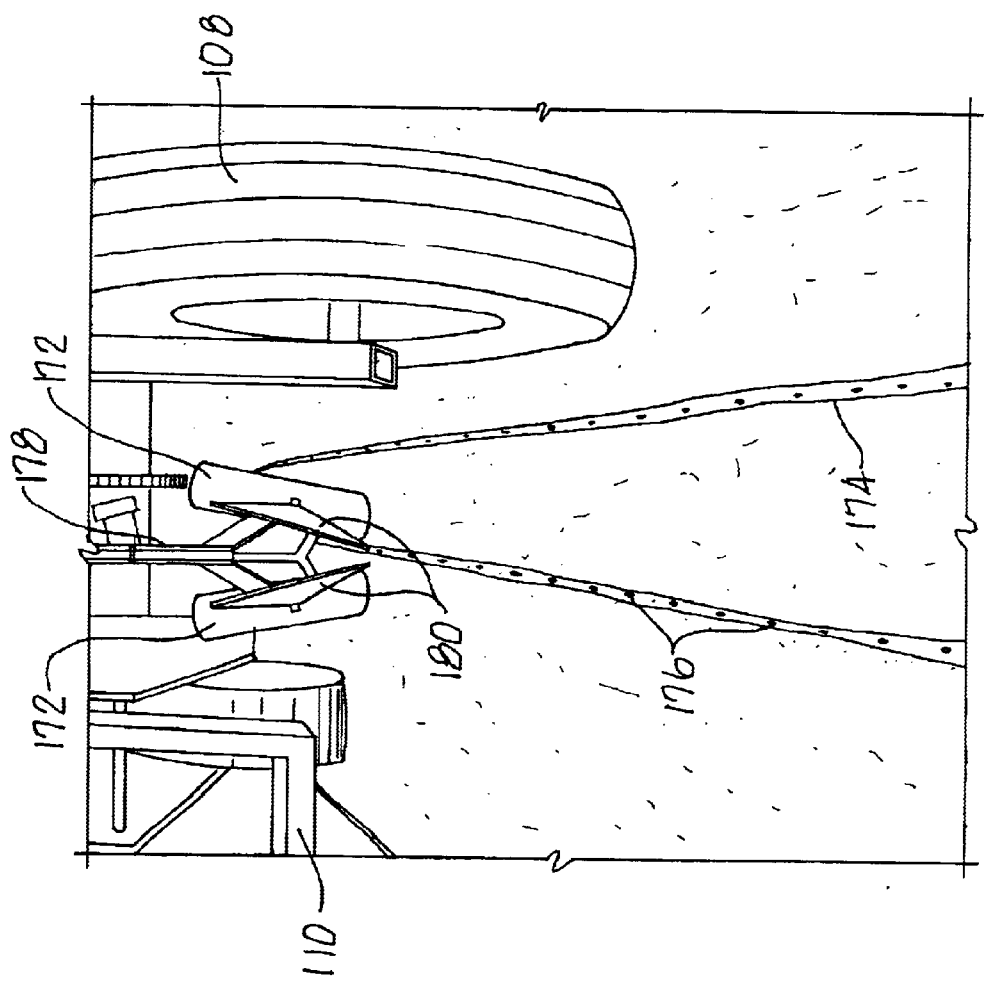
FIG. 6 shows spaced-apart seeds planted in a trench.
Figure 1:
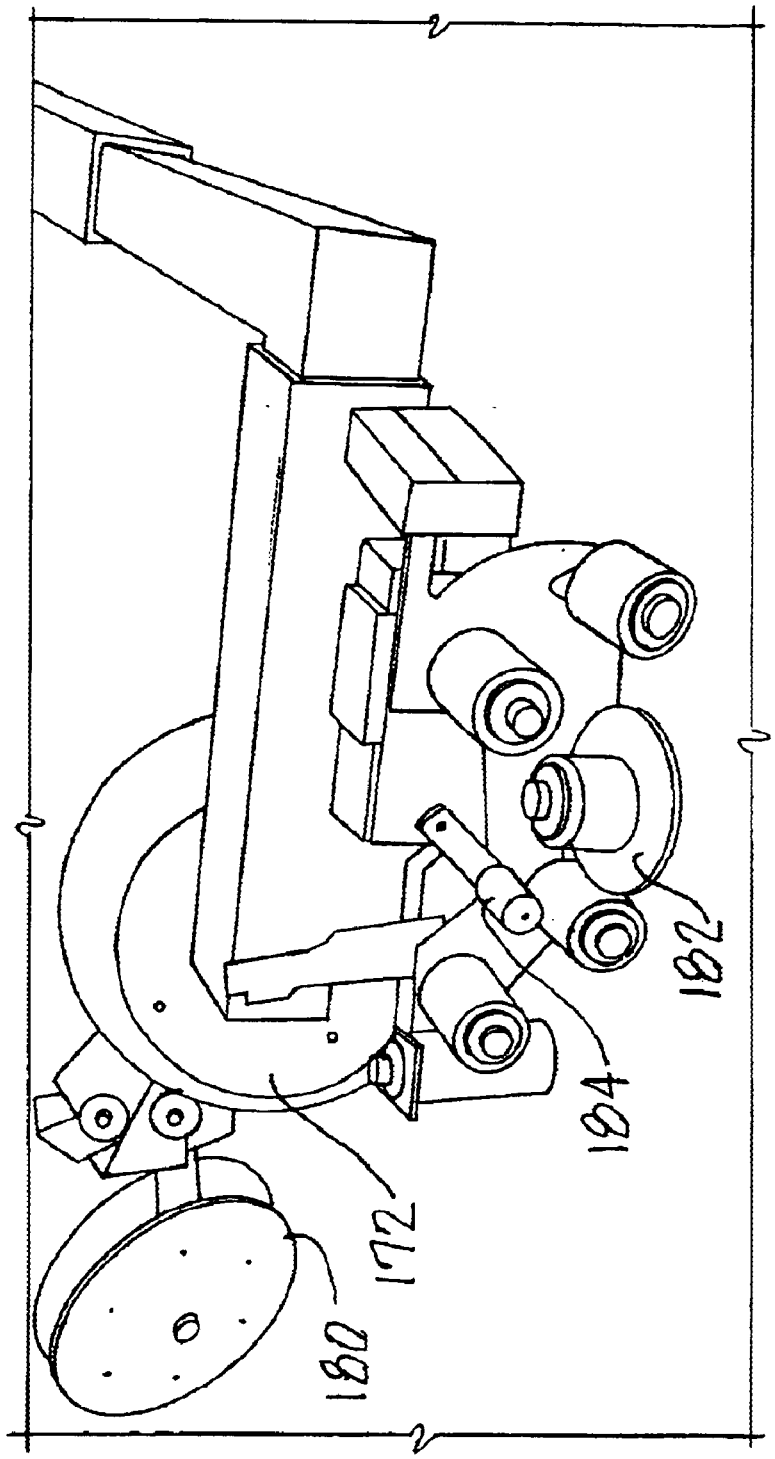

Referring to FIG. 6, double disk openers 170 and dual gauge wheels 172 combine to form a clean V-formed seed trench 174 containing spaced-apart seeds 176 from seed tube 178. Trailing closing wheels 180 firmly press the soil against the seeds. In FIG. 6, trailing closing wheels 180 are held above trench 174 in order to show the spacing of seeds 176.

Referring to FIG. 7, check cable head 182 extends from the side of vacuum planter 100 and receives a check cable which is threaded through check cable head 182. The check cable (not shown) has evenly spaced buttons. The first button is used to trigger initialization of the planting routine and calibration routines (described below) via an electronic switch 184. The system monitors the buttons to update calibration settings while in the planting mode (described below).

Figure 8A:
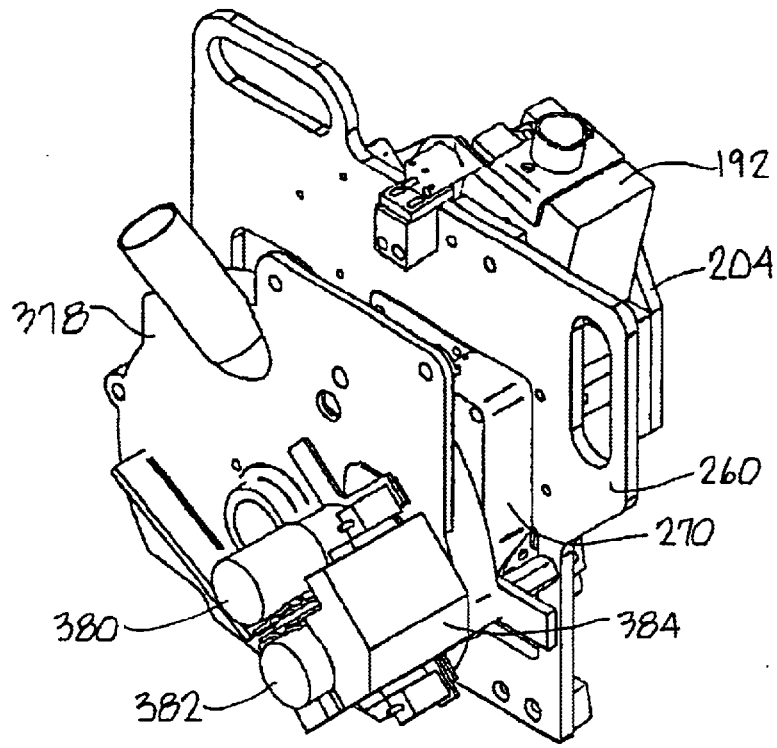
FIG. 8a is a front perspective illustration of an assembled metering unit.
Figure 8B:
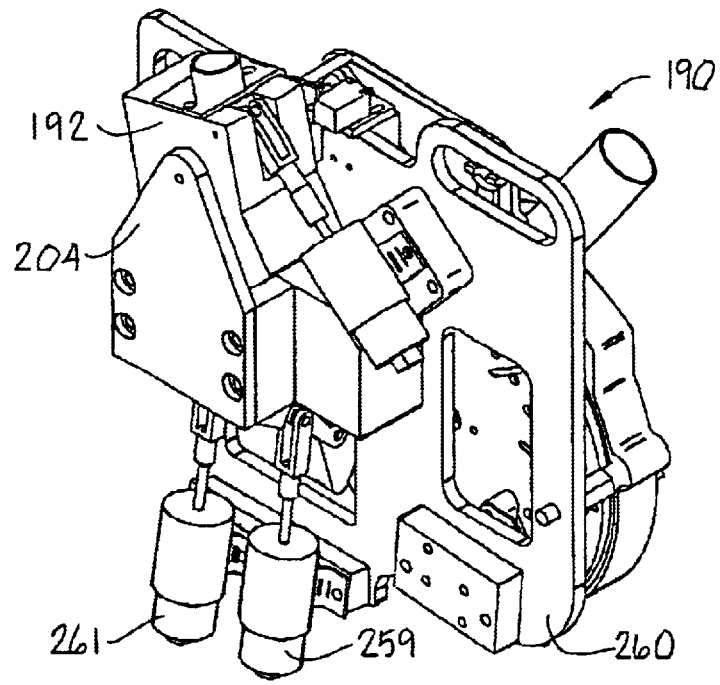
FIG. 8b is a rear perspective illustration of an assembled metering unit.
Figure 10:
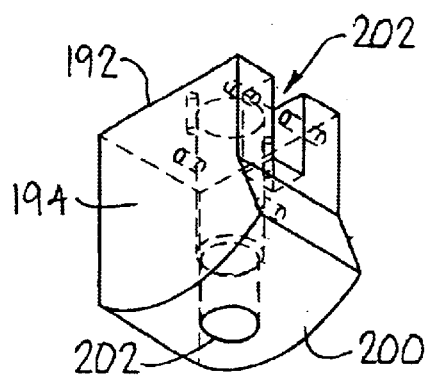
FIG. 10 is a perspective view of a diverter block.
Figure 11:
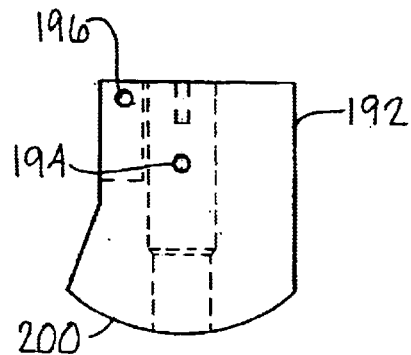
FIG. 11 is a front elevation view of the diverter of FIG. 10.
Figure 12:
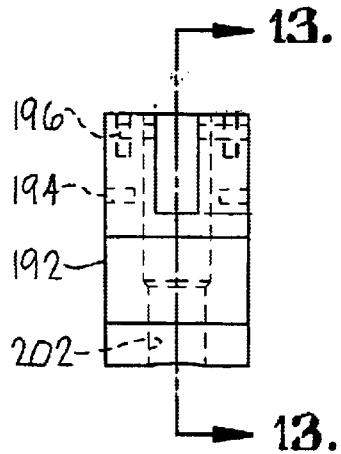
FIG. 12 is a side elevation view of the diverter of FIG. 10.
Figure 13:
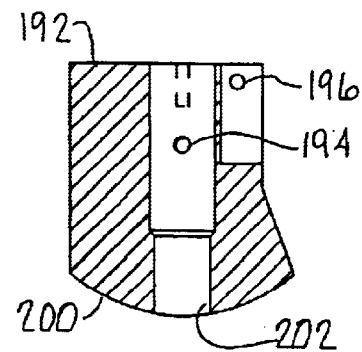
FIG. 13 is a sectional view taken along line A—A of FIG. 12.
Figure 14:
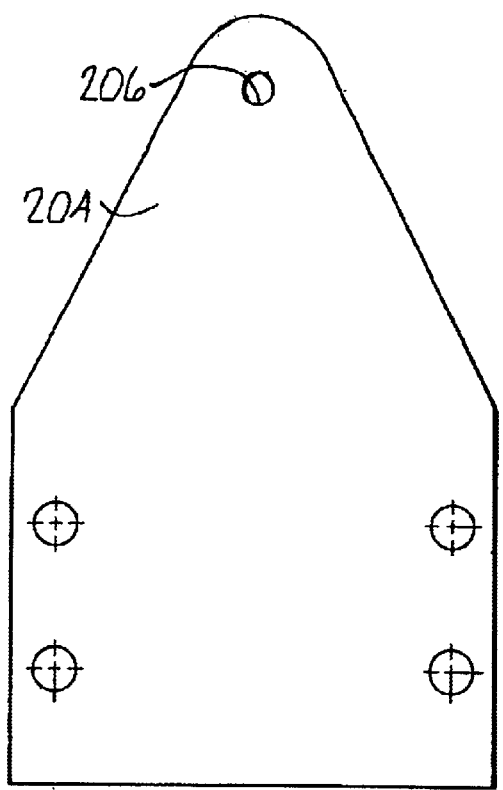
FIG. 14 is a mounting bracket for the diverter of FIG. 10.
Figure 15:
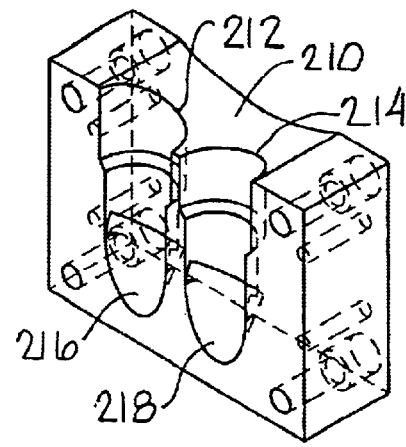
FIG. 15 is a perspective view of the seed tube block.
Figure 16:
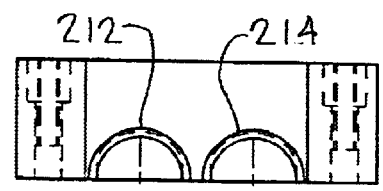
FIG. 16 is a top view of the seed tube block of FIG. 15.
Figure 17:
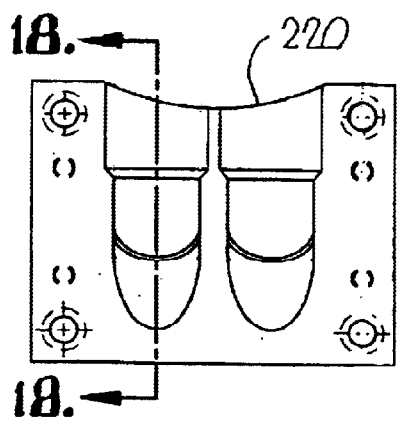
FIG. 17 is a front elevation view of the seed tube block of FIG. 15.
Figure 18:
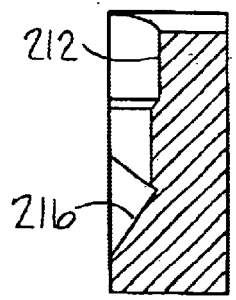
FIG. 18 is a cross-sectional view taken along line A—A of FIG. 17.
Figure 19:
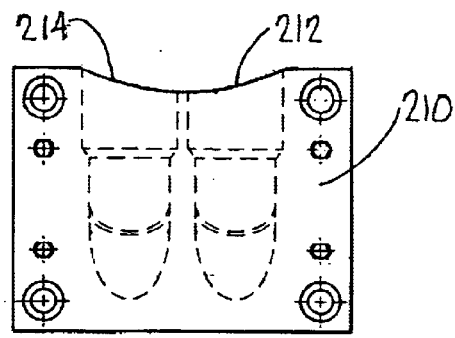
FIG. 19 is a rear elevational view of the seed tube block of FIG. 15.
Figure 20:
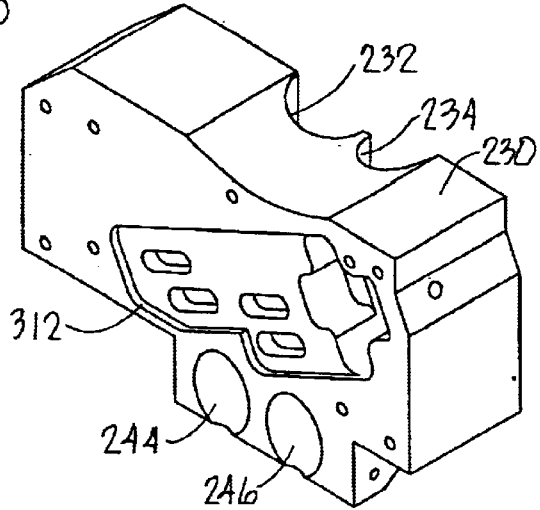
FIG. 20 is a front perspective view of the seed tube block diverter.
Figure 21:
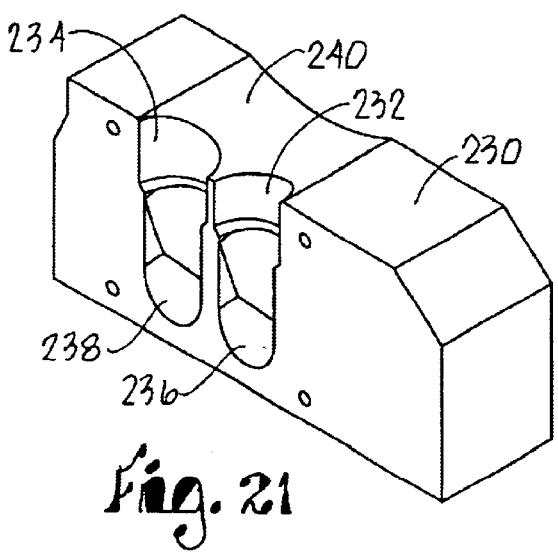
FIG. 21 is a rear perspective view of the seed tube block diverter of FIG. 20.
Figure 22:
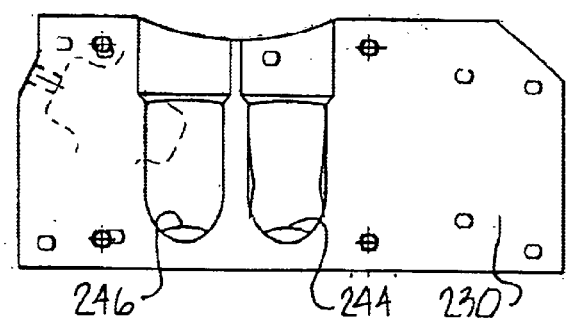
FIG. 22 is a rear elevational view of the seed tube block diverter of FIG. 21.
Figure 28:
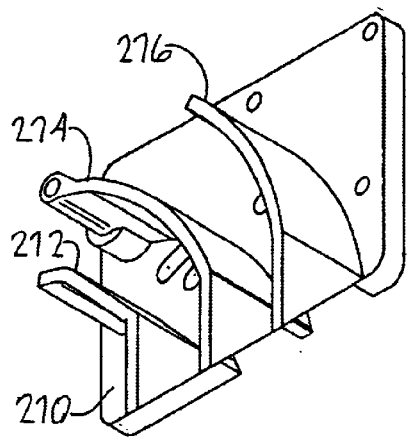
FIG. 28 is a perspective view of the divider vane.
Figure 29:
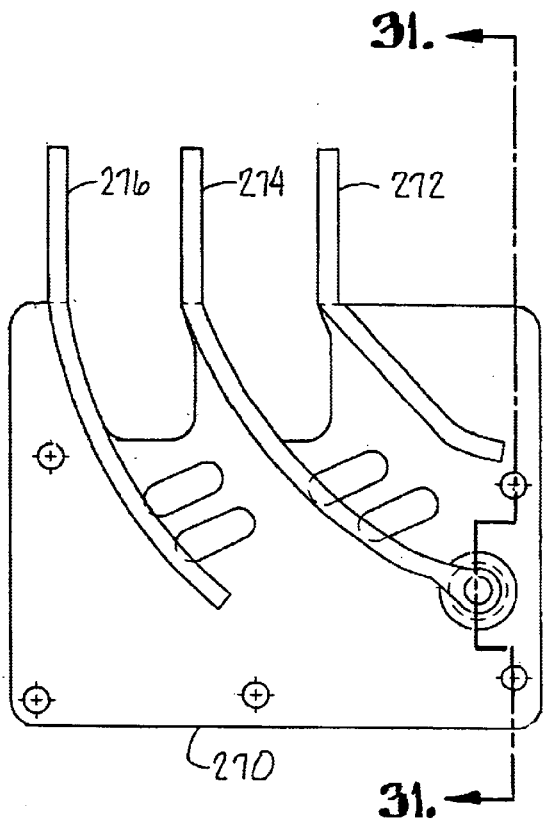
FIG. 29 is a front elevational view of the divider vane of FIG. 28.
Figure 30:
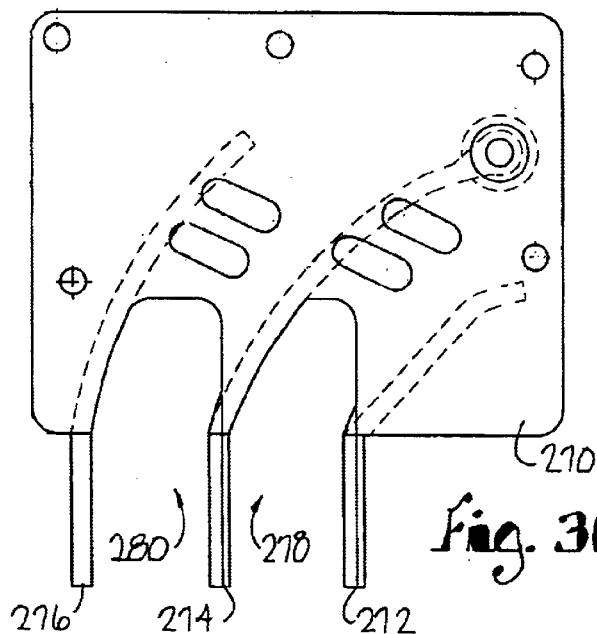
FIG. 30 is a rear elevational view of the divider vane of FIG. 28.
Figure 31:
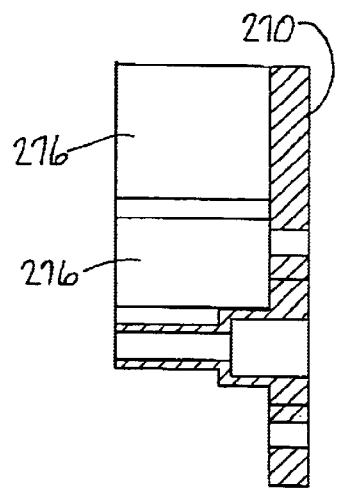
FIG. 31 is a sectional view of the divider vane of FIG. 29.
Figure 32:
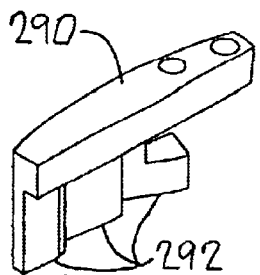
FIG. 32 is a perspective view of the inner singulator.
Figure 33:
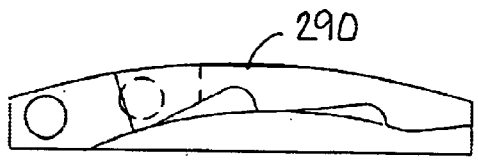
FIG. 33 is a rear elevational view of the singulator of FIG. 32.
Figure 35:
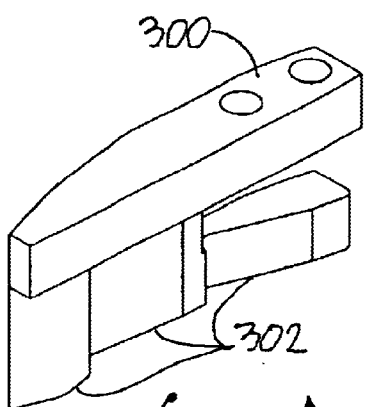
FIG. 35 is a perspective view of the outer singulator.
Figure 34:
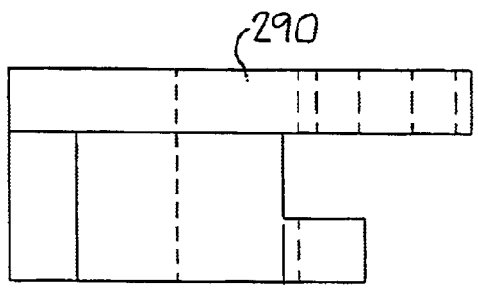
FIG. 34 is a front elevational view of the singulator of FIG. 32.
Figure 36:
FIG. 36 is a rear elevational view of the singulator of FIG. 35.
Figure 37:
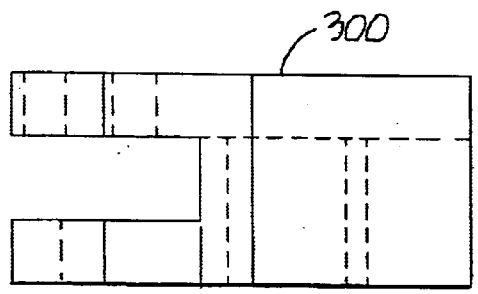
FIG. 37 is a front elevational view of the singulator of FIG. 35.

An assembled metering unit 130 is shown in FIGS. 8a and 8b, while an exploded view of metering unit 130 is shown in FIGS. 9a and 9b. Referring to FIGS. 8–13, seed diverter 192 pivots about axis 194 in response to actuation of solenoid 198 pivotally secured to pins 196 in diverter block 192. The lower surface 200 of diverter 192 is arc shaped with its radius of curvature extending from axis 194. Seed tube 202 extends from the upper surface of seed diverter 192 through its lower arcuate surface 200. Diverter plate 204, shown in FIG. 14, includes an aperture 206 which is axially aligned with pivot pin 194 extending from seed diverter 192.

The top half 210 of inner seed tube 212 and outer seed tube 214, and the bottom half 230 of inner seed tube 232 and outer seed tube 234 are shown in FIGS. 15–22. When top half 210 and bottom half 230 are bolted together, inner and outer seed tubes are formed which keep the seed completely separate to avoid cross contamination of seeds. The bottom portion of seed tube halves 112 and 114 are angled inwardly along surfaces 116 and 118, respectively, toward seed tube block 230. When blocks 210 and 230 are assembled, surfaces 236 and 238 align with surfaces 216 and 218, respectively, to form a sloping path to inner seed tube outlet 244 and outer seed tube outlet 246, respectively.

Figure 38:
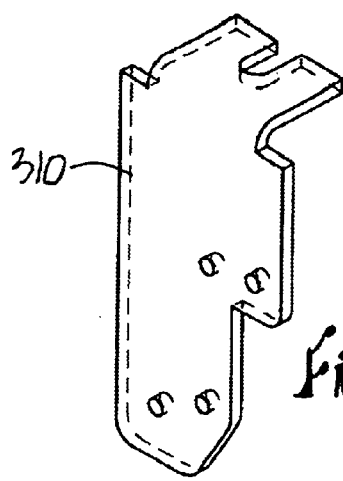
FIG. 38 is a perspective view of the singulator adjuster.

The upper arcuate surfaces 220 and 240 of seed tube blocks 210 and 230, respectively, have a radius of curvature which matches the radius of curvature of surface 200 of diverter block 192 shown in FIGS. 10–13. A cutout relief 312 on the rear face of block 230 provides a guide for singulator adjustment plate 310 described below in association with FIG. 38.

Referring to FIG. 9 and FIGS. 23–26, inner 250 and outer 251 seed sumps are illustrated, each having an inner arcuate surface 252 to provide path for the seeds from seed apertures 244 and 246 to the seed plate 330, discussed below. Inner 250 and outer 251 seed sumps include beveled surfaces 254 and 256. Beveled surface 254 is held against seed plate 330 in the sump to hold the seeds against the seed plate 330. Inner 250 and outer 251 sumps pivot about axis 258 in response to actuation of inner 259 and outer 261 seed dump solenoids.

The bottom half of seed tubes 230 is secured to cover plate 260 with inner 250 and outer 251 seed sumps extending through aperture 262 to engage seed plate 330 as shown in FIGS. 9 and 27.

Referring to FIGS. 9 and 28–31, divider vane 270 is illustrated. Divider vane 270 is sandwiched between cover plate 260 and seed plate 330. Divider vane 270 includes three vanes 272, 274 and 276 which present inner channel 278 and outer channel 280. Channels 278 and 280 are spaced such that inner and outer seed sumps 250 and 251 fit between the respective vanes and against seed plate 330. Divider vane 270 keeps the seeds separated at the plate to prevent cross contamination of the seeds.

Referring to FIGS. 32–38, inner seed singulator 290 and outer seed singulator 300 are illustrated. Inner seed singulator 290 and outer seed singulator 300 are adjustably mounted within inner divider vane channel 278 and outer divider vane channel 280, respectively. Singulators 290 and 300 include ribs or vanes 292 and 302, respectively, which singulate the seeds carried on seed plate 330 such that multiple seeds are not carried along these inner and outer rings on seed plate 330. Singulator adjustment plate 310 is used to adjust singulators 290 and 300 as a pair. A single adjustment screw (not shown) moves the singulators in and out radially to seed plate 330.

Figure 39:
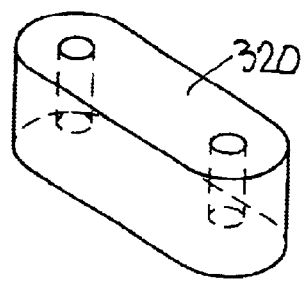
FIG. 39 is a perspective view of the seed ejector.

Referring to FIGS. 9 and 39, a pair of seed ejectors 320 are spaced along the inner and outer seed rings of plate 330 to ensure that the seed falls from the plate at the correct position.

Figure 40:
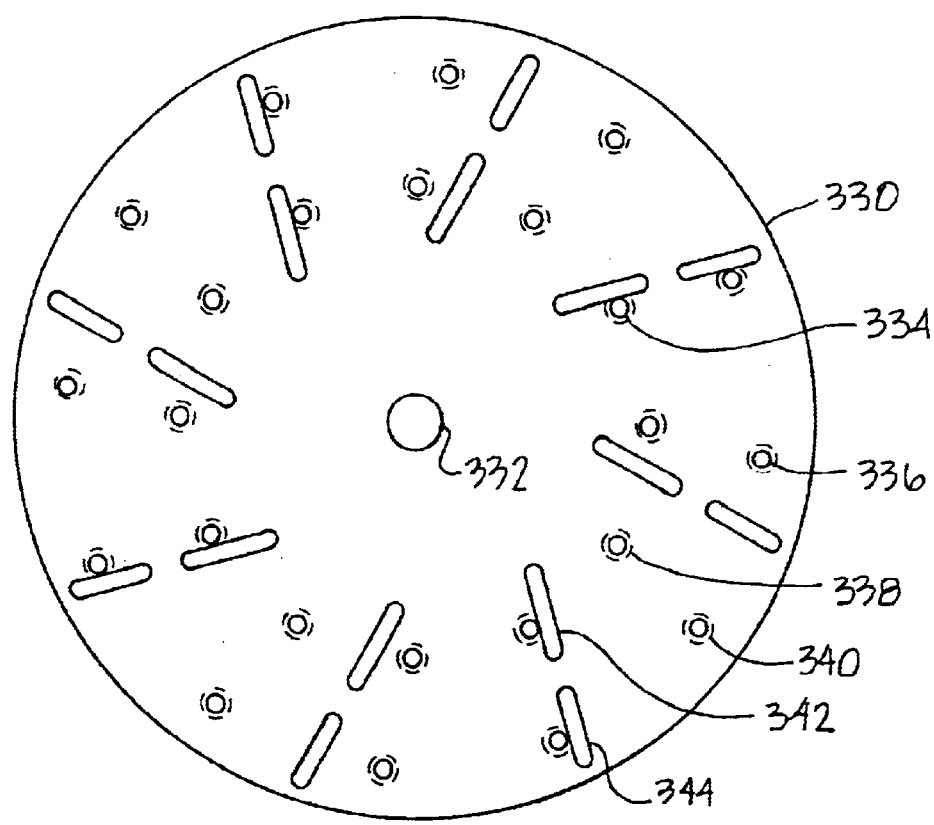
FIG. 40 is a front elevational view of the dual ring seed plate.

Referring to FIGS. 9 and 40, a dual ring seed plate is illustrated having an axis of rotation about axis 332, and having inner and outer ring of seed holes 334 and 336, respectively. On the rear or vacuum side of seed plate 330, seed holes 334 and 336 are countersunk as indicated by 338 and 340, to increase the air flow through inner and outer holes 334 and 336 thus increasing the vacuum level. Plate 330 includes inner 342 and outer 344 agitation grooves to keep the seed held against the vacuum seed plate 330 agitated to improve the seed pick up of seed holes 334 and 336. Seed plate 330 may be fabricated from a fabric/resin composite material which may be available from Orkot or any other rigid material able to be machined. Seed plate 330 rotates clockwise as planter 100 moves forward.

Figure 41:
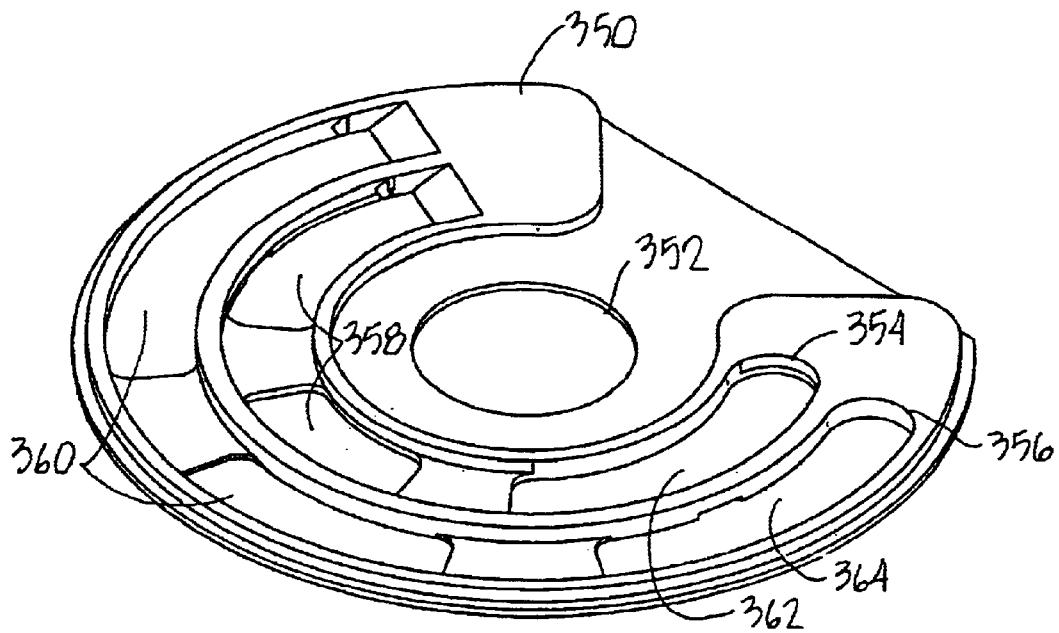
FIG. 41 is a perspective view of the vacuum seal plate.
Figure 42:
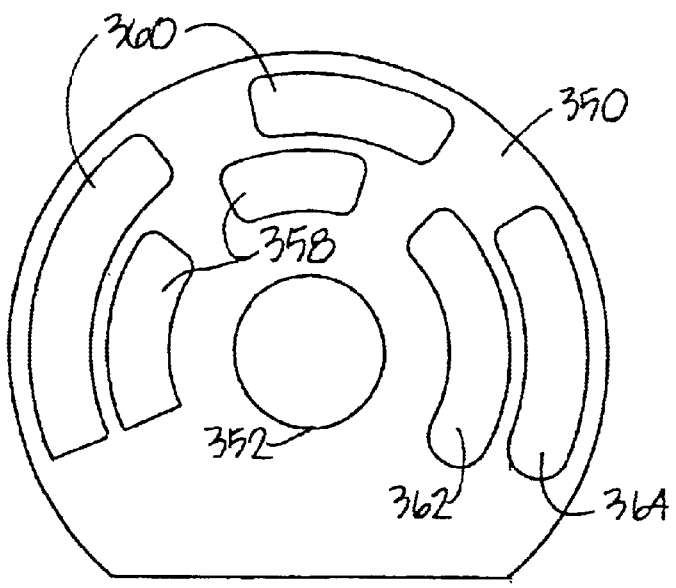
FIG. 42 is a rear elevational view of the vacuum seal plate of FIG. 41.
Figure 43:
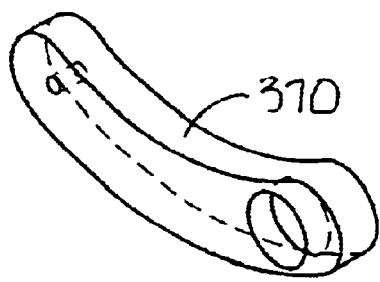
FIG. 43 is a perspective view of the inner vacuum cutoff shoe.
Figure 44:
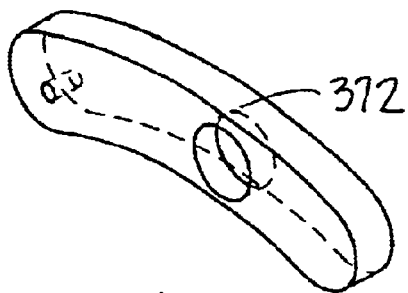
FIG. 44 is a perspective view of the outer vacuum cutoff shoe.
Figure 45:
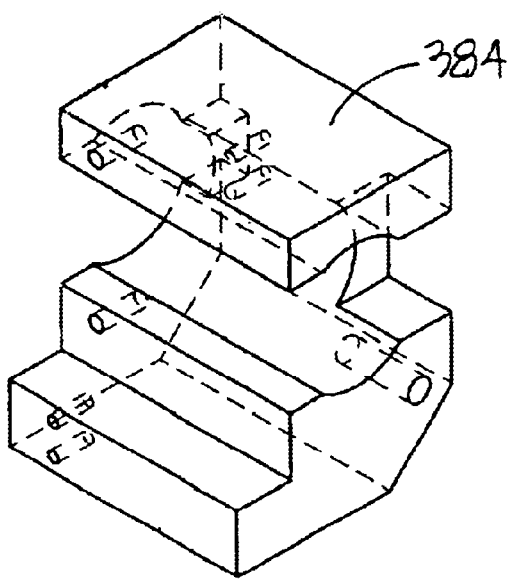
FIG. 45 is a perspective view of the vacuum cutoff solenoid mount.
Figure 46:
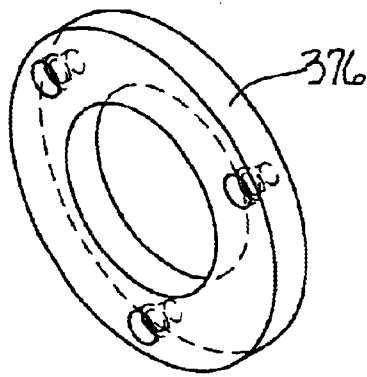
FIG. 46 is a perspective view of the vacuum ring.

Referring to FIGS. 9, 41 and 42, vacuum seal 350 is illustrated having an inner aperture 352 which is axially aligned with axis 332 of seed plate 330. Vacuum seal 350 has inner channel 354 and outer channel 356 which provide a vacuum area for seed holes 334 and 336 on seed plate 330. The vacuum applied to the back of plate 350 is transferred to the chambers through openings 358, 360, 362 and 364. Aperture 352 accommodates vacuum seal 376 shown in FIG. 46. Opening 362 in vacuum seal plate 3650 accommodates inner vacuum cutoff shoe 370 and opening 364 in vacuum seal plate 350 accommodates outer vacuum cutoff shoe 372 shown in FIGS. 43 and 44.

Vacuum cutoff shoes 370 and 372 are spring or biased to the back side of seed plate 330 and pulled off or disengaged from plate 330 upon actuation of inner solenoid 380 and outer solenoid 382 shown in FIG. 9, which are linked to inner shoe 370 and outer shoe 372 through connecting rods extending through apertures in vacuum housing plate 378. Solenoids 380 and 382 are held in place with mounting block 384 secured to housing 378. When vacuum cutoff shoes 370 and 372 are spring loaded to seed plate 330 they cutoff the vacuum to the respective set of seed holes 334 and 336 and prevent seed in the inner and outer sumps 250 and 251 from being picked up. When one of the shoes 370 or 372 is pulled from plate 330 by actuation of either solenoid 380 or 382, respectively, the vacuum is allowed to reach holes 334 and 336 in seed plate 330 where seed in the inner 250 or outer 251 sump may be picked up. This permits staging of the seed against seed plate 330 so that it is readily available for the start of a plot. Additionally, this permits more accurate starts and stops to plots.

Referring to FIGS. 4 and 47 through 49, control of the metering unit discussed above is accomplished using computer 150 housed in cabinet 118. Fan 152 provides cooling air for computer 150. Inputs and outputs to computer 150 are connected through wiring strips 153, through relays 154, to the signal conditioning and monitoring board 156 and I O board 900. Input power from tractor 102 (FIG. 1) passes through transformers 58 to computer 150 and the solenoids discussed hereinabove.

Figure 48:
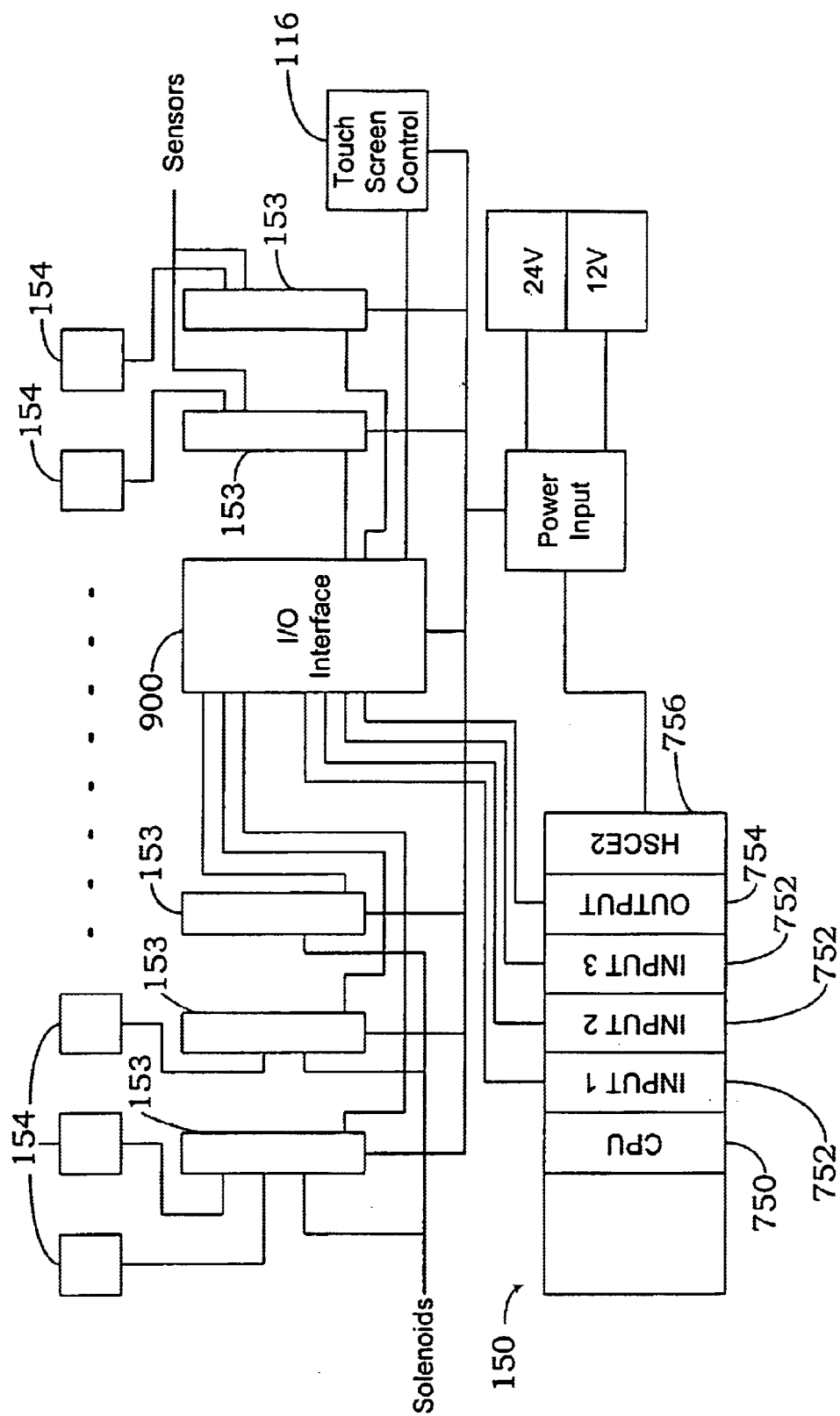
FIG. 48 is an electrical schematic of the PLC interface.

Referring to FIG. 48, computer 150 consists of CPU 750, input modules 752, output module 754 and counter module 756. In the preferred embodiment, computer 115 is an Allen-Bradley programmable logic controller (PLC) Model No. SLC5/03 (CPU 750). PLC 150 monitors and controls sensors, signals and solenoids through I/O interface board 900 and signal conditioning and monitoring board 156. User inputs to PLC 150 are provided through touch screen 116 which displays information from PLC 150.

Figure 47:
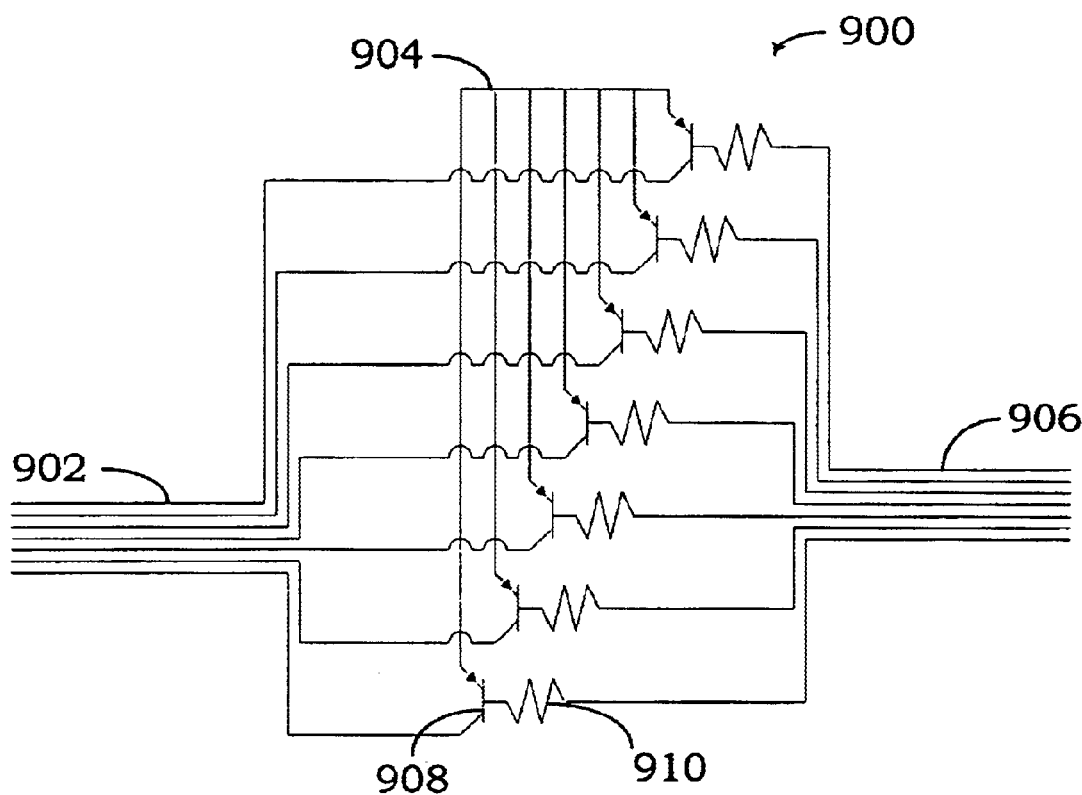
FIG. 47 is an electrical schematic of a PLC I O interface circuit.
Figure 49:
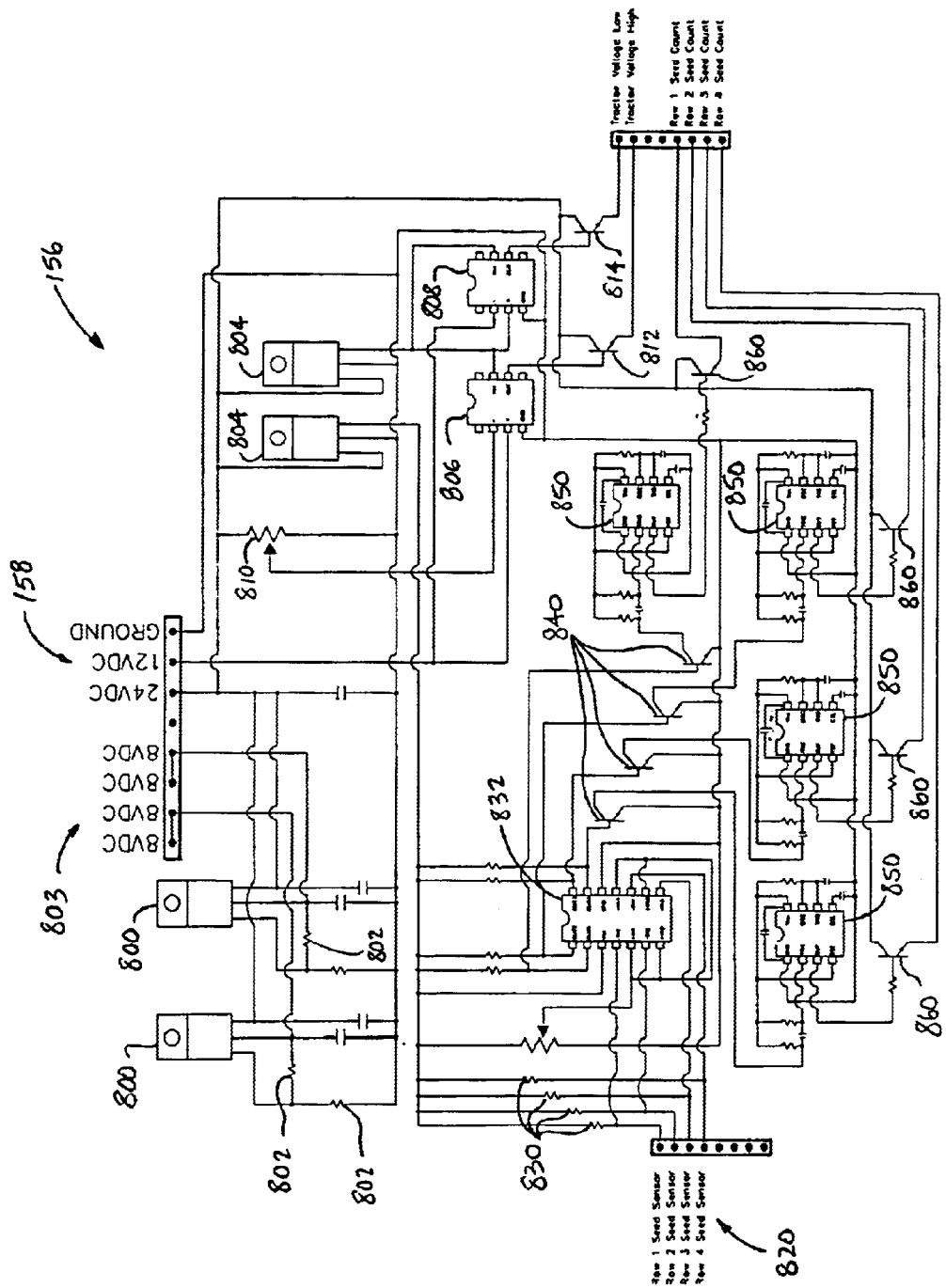
FIG. 49 is an electrical schematic of the signal conditioning and monitoring board sensor.

Referring to FIG. 47, I/O interface board 900 acts as a series of switches between PLC modules 752, 754 and 756, and the sensors, solenoids, other signals and power supplies. I/O board 900 reduces the possibility of noise affecting PLC 150. Outputs 902 go high to 24 volts DC 904 when activated, and float low when in the off state. Each output 902 has its own transistor 908 (such as part No. 2N3904) that it uses to switch a 12-volt DC input signal 906 to its corresponding output device connected to one of outputs 902 to be turned on or off. Each input signal 906 passes through resistor 910 to the base of transistor 908, which switches power from connector 904 to outputs 902. Transistor 908 may be a PNP transistor or a JFET transistor. An electrical schematic of the signal conditioning and monitoring board 156 is shown in FIG. 49. Variable voltage regulators 800 (such as part No. LM317) are wired using resistors 802 to convert the 24-volt DC input from power supply 158 to an 8-volt DC regulated output 803. Output 803 supplies clean, noise-free power to the seed sensors. Each voltage regulator 800 includes a heat sink in order to supply enough current without overheating.

Fixed 12-volt DC regulators 804 supply clean, noise-free power to all of the chips on board 156, and provide the reference value for the low-voltage alarm.

OP-amps 806 and 808 are configured as comparators for the power supply voltage alarm. Each amplifier 806 and 808 has one input tied directly to the input supply voltage 158 which is the signal being tested. The low voltage reference is the clean 12-volt DC output from voltage regulators 804. The high-voltage for OP amp 806 is set by potentiometer 810. If the supply voltage 158 rises above the high threshold, the output from OP amp 806 will immediately turn on NPN transistor 812 which switches the 24-volt DC input from supply 158 to the corresponding PLC input which is in turn detected by the PLC software, which displays the appropriate error message and sounds an alarm as discussed in detail below. If supply voltage 158 drops below the low threshold, OP amp 808 turns on NPN transistor 814 which switches 24 volt DC power from supply 158 to the appropriate PLC input. In response, the PLC software displays the appropriate low-voltage error message, and activates an alarm, as discussed in detail below.

Seed sensor input signals 820 are each pulled up to 12 volts DC by 100K resistors 830 when in the off state. Depending on the strength of the signal received from the seed sensor, the corresponding output from the sensor (input 820 to board 156) is pulled low. Signals 820 are then input to a 339 quad OP-amp comparator 832. Each input signal 820 is compared to a threshold value when a signal 820 drops below the threshold, the corresponding output from OP amp 832 switches the corresponding transistor 840 on, which transmits the signal to the input of corresponding timer 850. Timers 850 (such as part No. NE555) are all configured as mono stable multi vibrators (one-shots). Timers 850 produce an output pulse of consistent time duration regardless of the length of the input trigger pulse. The outputs from one shot timers 850 turn on and off their corresponding transistor which sends a 20 volt DC signal to the corresponding PLC input module. The sensitivity of the seed sensors can be adjusted by changing the threshold voltage at the input to the comparator 832. Since the seed sensors are sinking sensors, raising the threshold increases sensitivity and lowering the threshold decreases sensitivity. Timers 850 ensure the each seed signal pulse is long enough to be detected and counted by the PLC program.

Referring to FIGS. 50–60, upon initialization or start up of PLC 150 (FIG. 4), the PLC software begins execution as illustrated by block 500. Execution is delayed for a predetermined period of time to allow the sensors and power supplies to stabilize 502. If the sensors and power supplies are not correctly initialized 504 the system reboots 506 and returns to start 500. If the system is correctly initialized 504, the main menu 508 is displayed on touch screen 118 and provides the operator with a choice 510 of display options.

If the operator selects solenoid sensor check 512, the sensor and solenoid check screen is displayed with touch buttons for each solenoid on the planter. All solenoids may be released by selecting button 514. Individual solenoids may be energized by selecting the solenoid button such as fire diverter 516, fire outside sump solenoid 518, fire inner sump solenoid 520, fire outer vacuum shoe 522, and fire inner vacuum shoe solenoid 524. Touch screen 118 displays the current state for each solenoid.

Similarly, the state of the solenoids may be toggled to the relaxed state by selecting diverter solenoid 526, outer sump solenoid 528, inner sump solenoid 530, outer vacuum shoe solenoid 532, or inner vacuum shoe solenoid 534. If the state of a solenoid fails to change as indicated on touch screen 118 after toggling a solenoid between the energized and relaxed states, either the associated position sensor for the solenoid has failed, the solenoid itself has failed or there is an obstruction preventing the solenoid from moving between states. The sensor and solenoid check 512 is primarily a diagnostic mode of operation that may be used to determine if any of the solenoids or sensors are not operating properly. The operator selects exit 536 to return to main menu 538.

Figure 50:
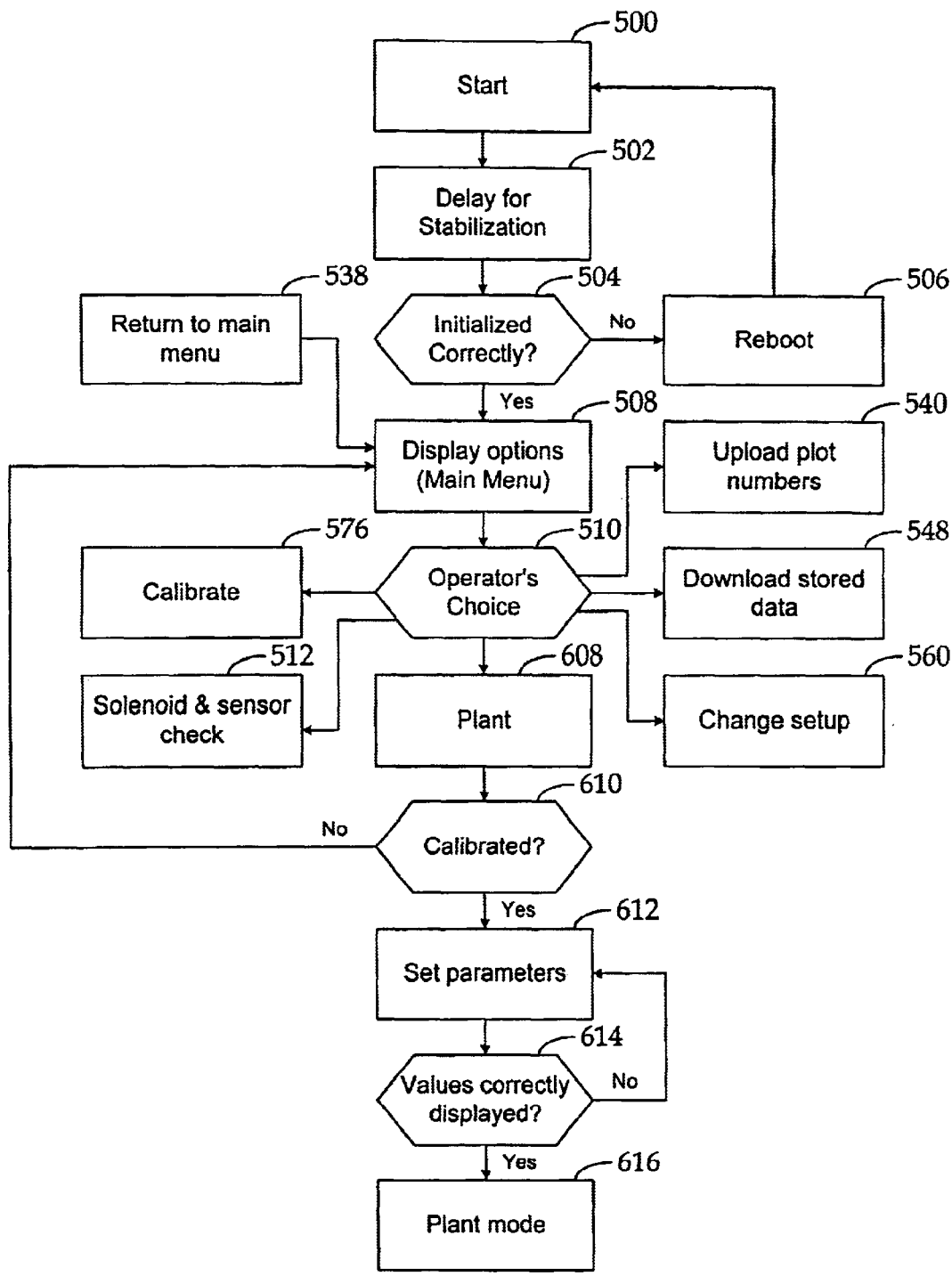
FIG. 50 is a software flow chart of the PLC startup menu.
Figure 51:
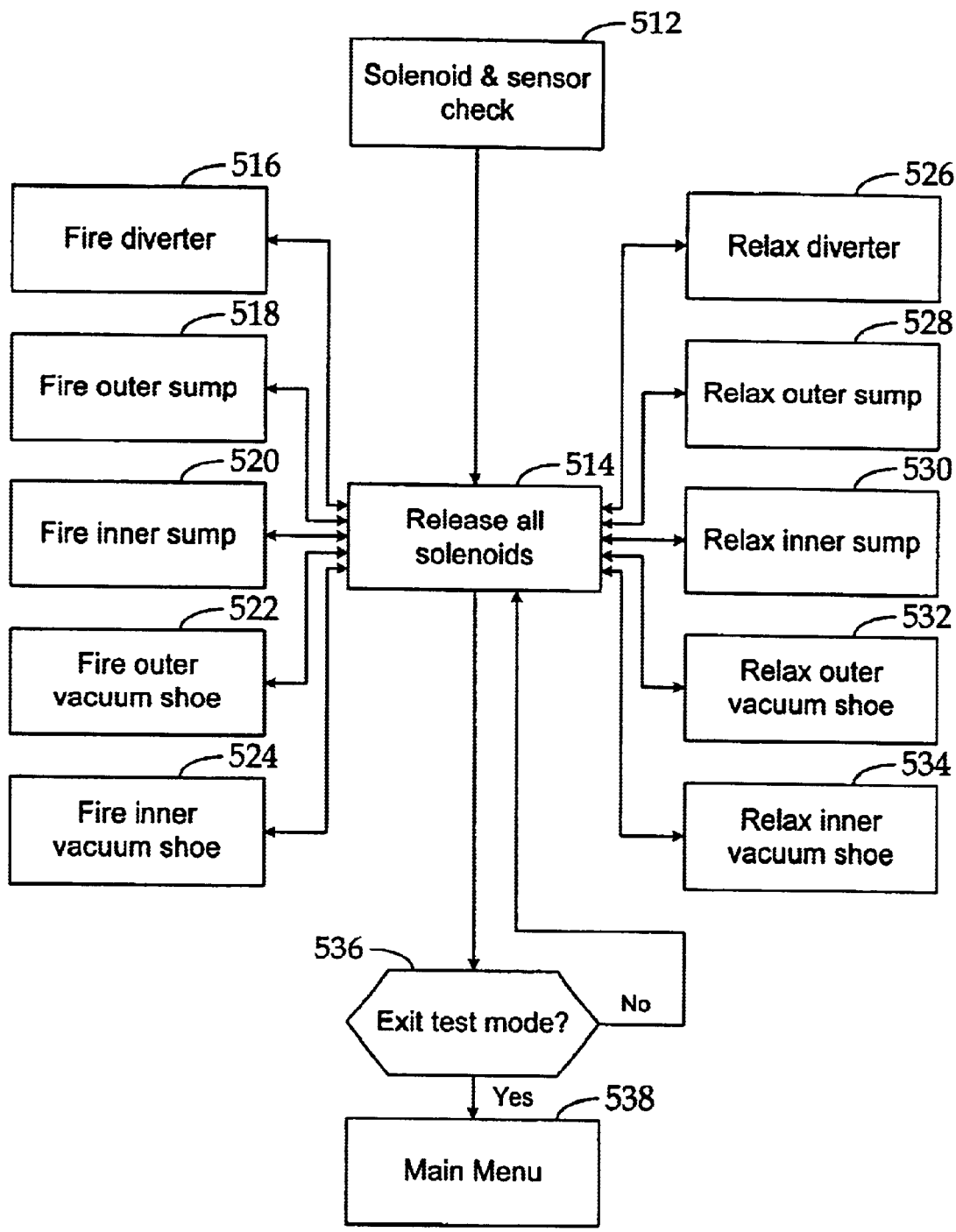
FIG. 51 is the PLC solenoid and sensor check software flow chart.
Figure 55:
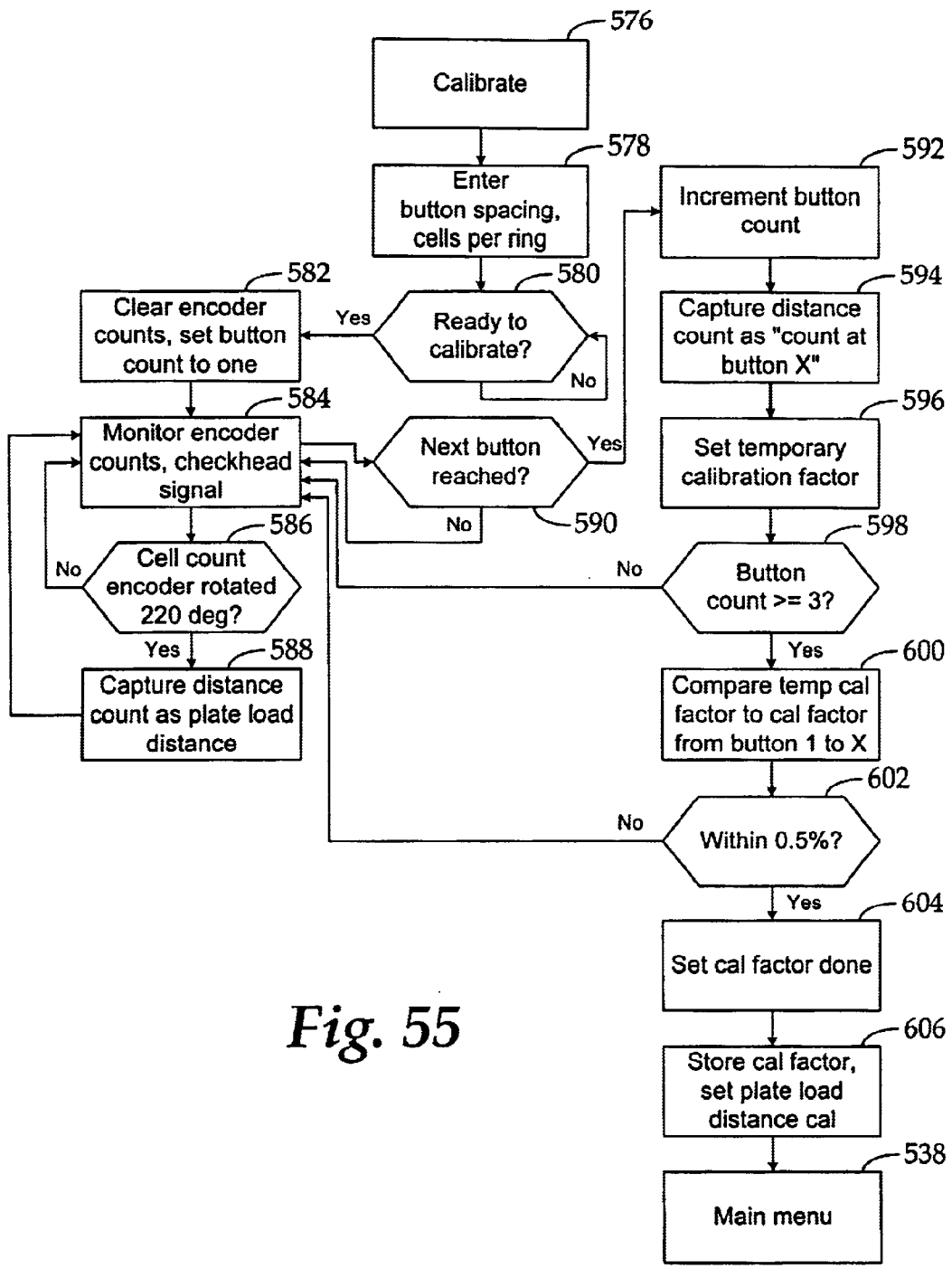
FIG. 55 is the calibrate software flow chart.
Figure 56:
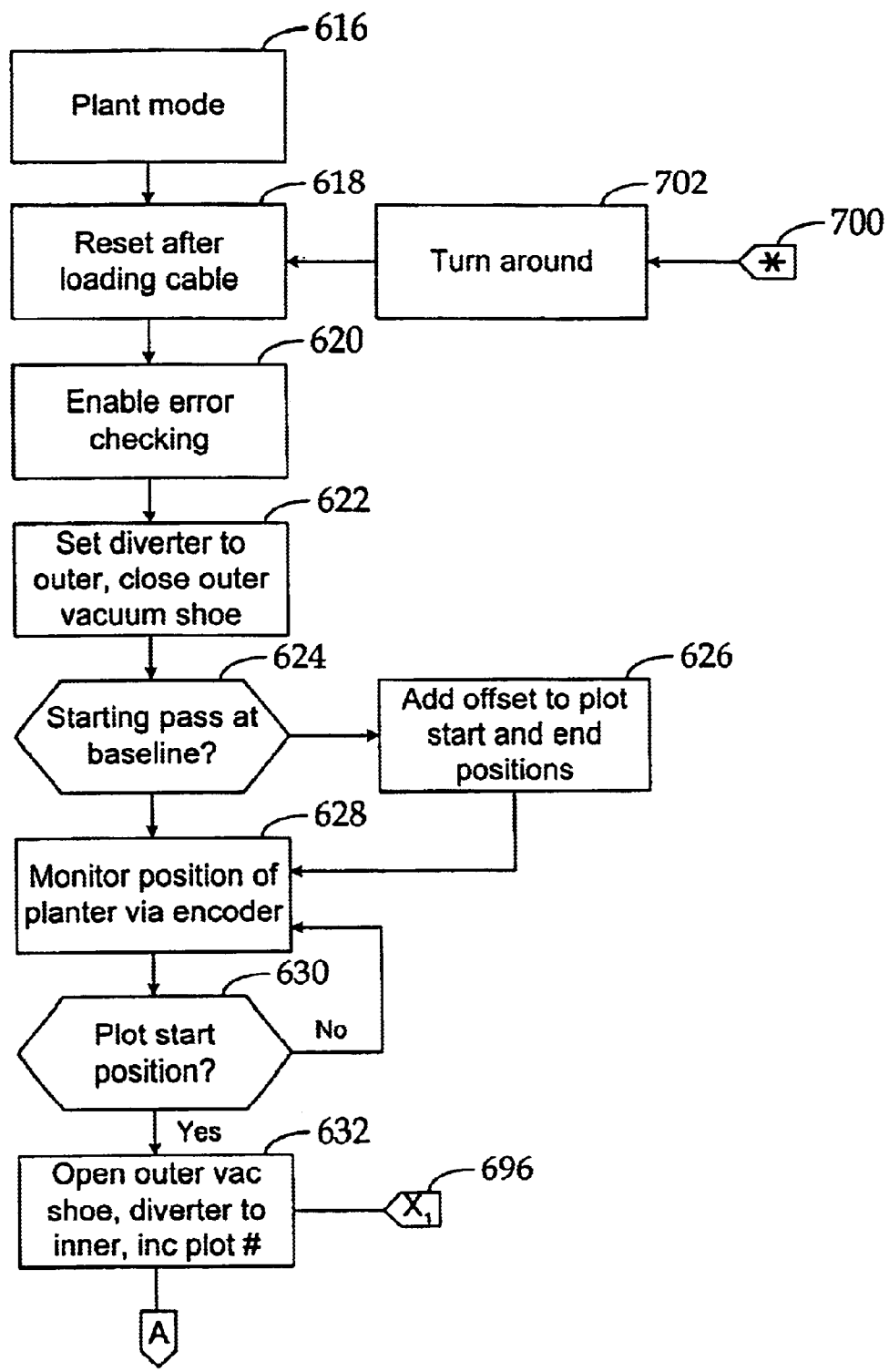
FIGS. 56 through 59 are the plant mode software flow charts.
Figure 57:
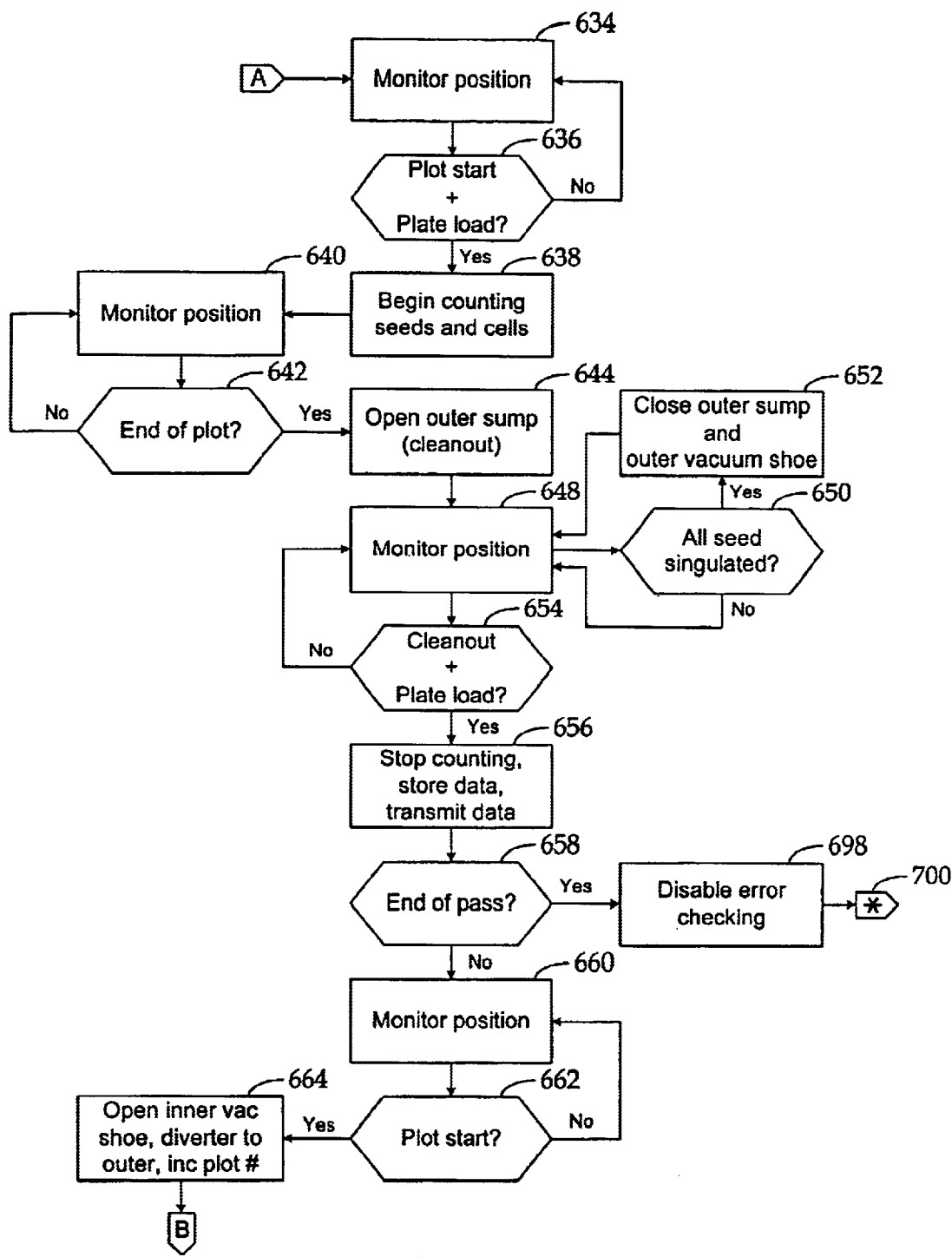
Figure 58:
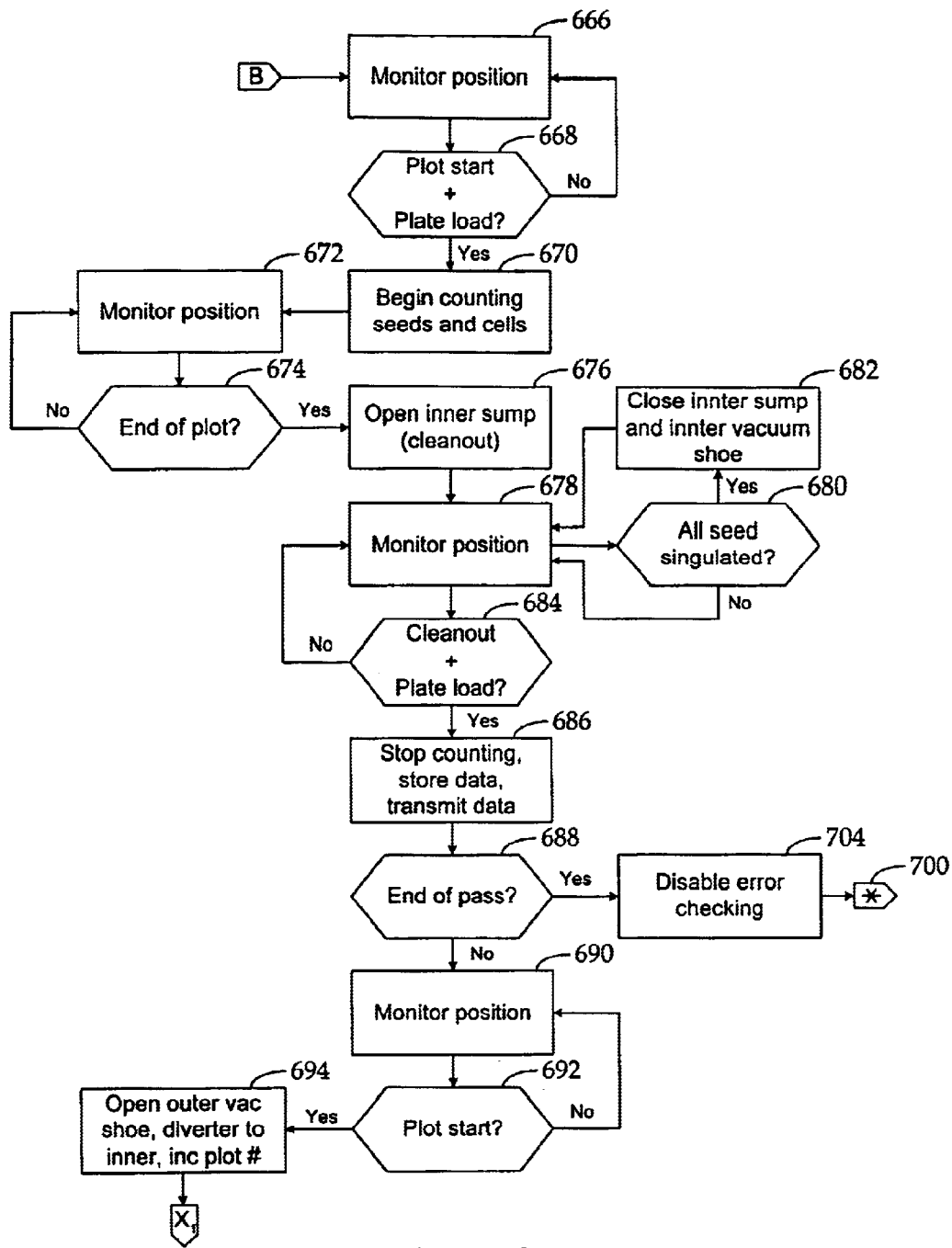
Figure 59:
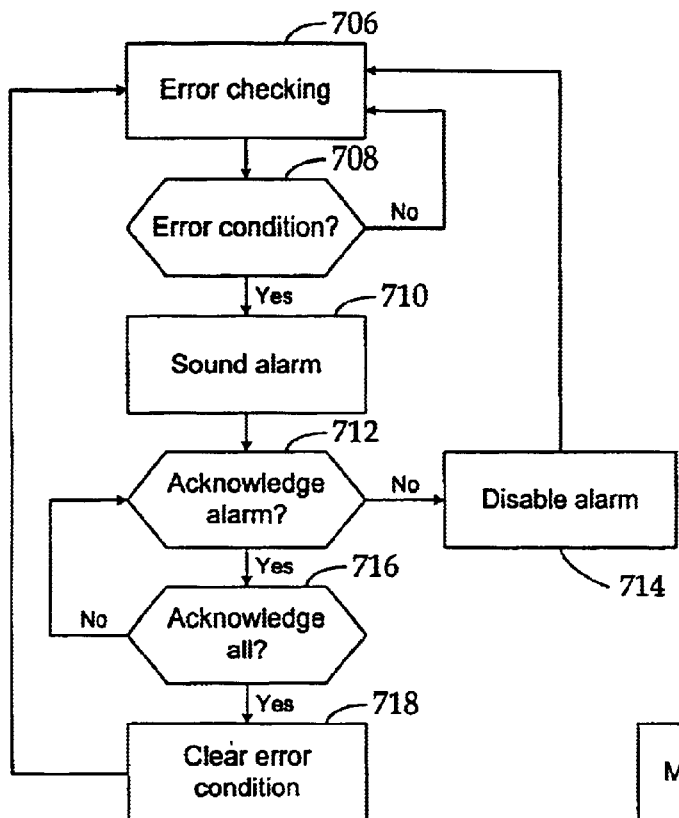
Figure 60:
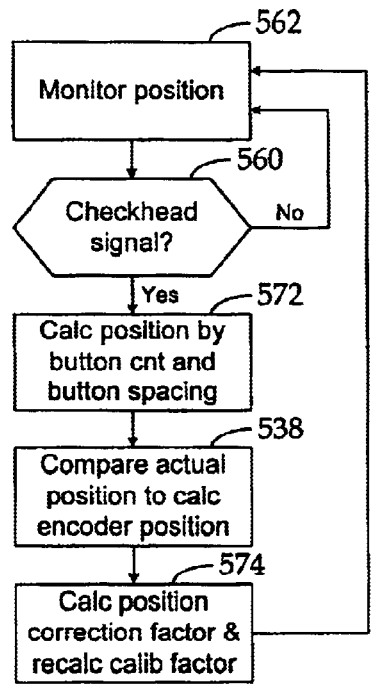
FIG. 60 is the position monitor and calibration software flow chart.

From the main menu as shown in FIG. 50, the operator may select upload plot numbers 540. When this option is selected, the program goes into a "ready to receive" mode 542 so that the operator may input their own plot numbers via as RS 232 cable to be stored with the collected data. The plot numbers file may be a comma-delimited ascii text file with plot numbers. The program will continue to receive plot numbers 544 until an end of file character 546 is received. When the end of file is received, the program stores the input strings entered by the operator and returns to the main menu 538. If the operator does not enter his or her own plot numbers, a standard set of range and row numbers starting with row one, range one and increasing from that point are used.

If the operator selects download stored data 548, the program initializes the COM port to send data 550. The first plot of data is converted to ASCII format 552 and sent out through an RS 232 COM port 554. If an end of file has not been sent 556, the register is moved to the next plot address 558 and converted to ASCII format 552. The next plot of data is sent 554 and then checked for end of file 556. If an end of file has been sent to indicate the end of the plot data, the program returns to the main menu 538. Once all the data has been sent, the storage addresses in the PLC are reset so that the maximum amount of data storage space is available for the next run. The RS 232 port is a standard configuration DB9 connector.

From the main menu 508, the operator may choose 510 to change the set up 560. Various user options are displayed 562 such as to send data as taken 564 which sets up the RS 232 COM port and sets a flag in the program to send data for each plot 566 at the end of each plot. In the preferred embodiment, the number of rows to be simultaneously planted may be set 568 between one and four rows. However, it should be appreciated that a planter 100 may be configured to plant more than four rows at a time. Planter 100, as shown in FIG. 1, is set up to plant two rows simultaneously. The power sensitivity check may be set 570 to low, medium, high or off 572. This allows transients caused by actuation of the solenoids to be ignored. The actuation or pull time for each solenoid 574 may be set to allow additional time for the solenoids to actuate before an error is indicated to the operator. This is useful when a solenoid is weak. After the options have been set 562, the operator may return to the main menu 538.

Figure 61:
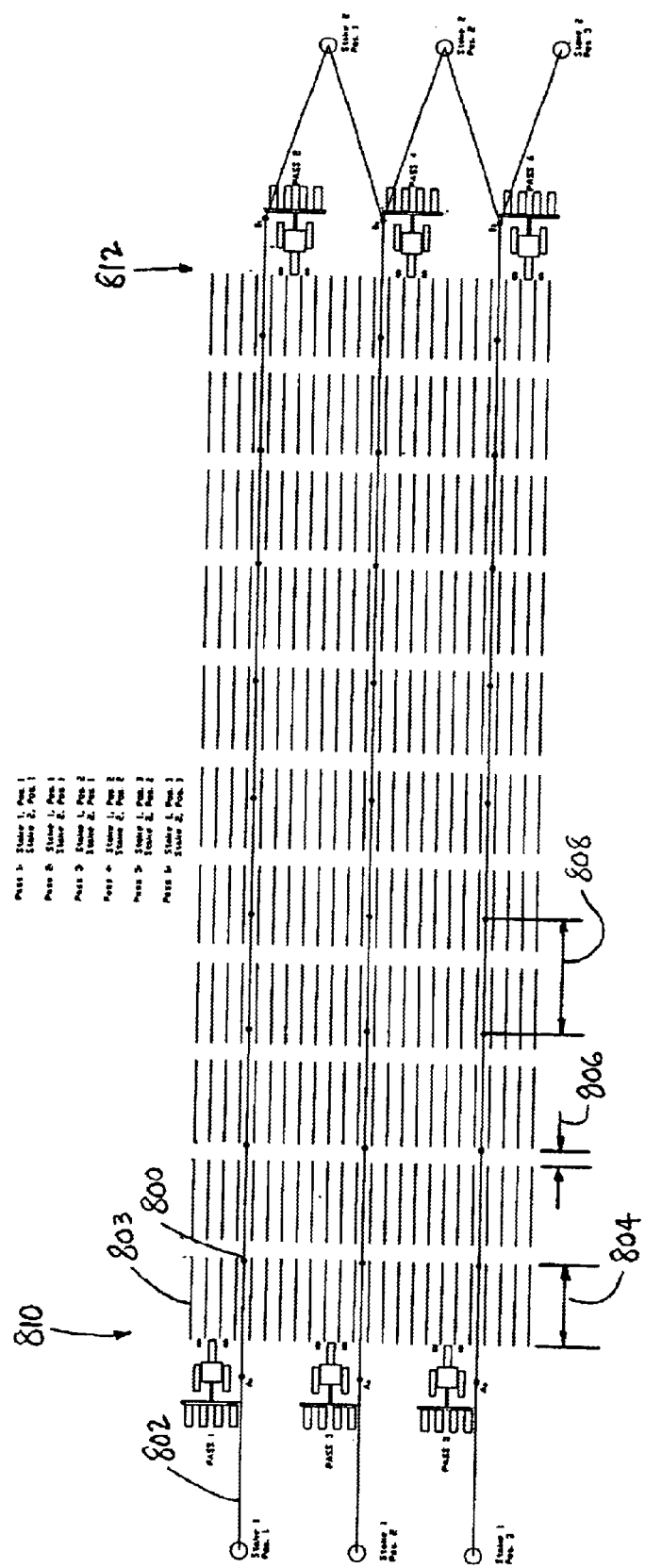
FIG. 61 is a diagrammatic illustration of a row plot.

From the main menu 508 the operator may choose 510 to calibrate the system 576. Calibration is necessary only when the planter is used for the first time for the day, although it may be used anytime the user feels that it is necessary. When calibration is selected 576 the operator enters the button spacings and the cells per ring 578 corresponding to the distance between buttons 800 on cable trip wire 802 shown in FIG. 61 and the ring of seed holes 334 shown in FIG. 40. When the system is ready to calibrate 580, the encoder counts are cleared when the first button is detected and the button count is set to one 582. The calibration procedure compares the pulses coming from a rotary encoder being driven off of a wheel contacting the ground and rolling during normal operation, to a known position according to the distance between buttons on the cable trip wire and calculates a correction factor that gives the correct position of the planter at any point using the encoder pulses. The calibration procedure monitors and counts the encoder pulses and waits to receive a check head signal 584 from switch 184 on check head 180.

When the cell counting encoder has rotated 220° 586, the distance count is stored as the uncalibrated plate load distance 588. The plate load distance is the distance traveled between the position where the vacuum is allowed to the plate 330 and seeds are picked up, to the position where the plate 330 has rotated around and the seeds are dropped off and planted in the soil. When the next button is reached 590, the button count is incremented 592 and the distance for button two is captured 594. A temporary calibration factor is set 596 based on the encoder counts between the first and second buttons.

Next, the program checks to see if the button count is greater than or equal to three 598. If it is not, the program flow returns to monitor the encoder counts and the check head signal 584 and the loop repeats. Once the button count is greater than or equal to three 598, the temporary calibration factor is compared to the calibration factor calculated between button one and the last button 600. If the difference between the temporary calibration factor and the overall calibration factor is not within 0.5% 602, then another set of encoder data is collected and the loop is repeated. Once the temporary calibration factor from the last button counted is within 0.5% of the overall calibration factor, the calibration is complete 604 and the calibration factor and load plate distance is stored 606. The load plate distance is calculated by using the input pulses from two encoders. One encoder is turning at a rate proportional to the drive wheel, or ground travel, and the other is turning at a rate proportional to the seed plate 330 rotation on the seed metering units 130. When these calibration factors are successfully calculated, the user may go back to the main menu 538.

From main menu 508 the operator may choose 510 to start planting 508. The system first checks to determine if the system is calibrated 610. If the system is not calibrated, processing returns to the main menu 500. If the system is calibrated, the operator is presented with several screens to input all the factors necessary to plant the desired plots 612. The operator will enter the plot length 804, which is the distance between the first seed in the plot and the last seed in the plot. Next the user will enter the alley length 806, which is the distance between plots where no seed are planted, or a "dead space" in the field to separate adjacent plots. Next the button spacing 808 of the check cable 802, if one is being used is input. Next the number of cells or holes per ring on the seed plate 330 are entered. At this point, the operator may choose to start where he or she left off with current range and row numbers, or the operator may clear out the data storage addresses and reset the plot identification numbers. Finally the operator enters the number of plots 803 that are in each trip down the field. Given this information, the number of buttons 800 on check cable 802 that are necessary to properly plant the field is displayed. When all information is entered, a screen is displayed showing the seed counts per row, plot identification number, time taken to plant the plot, and the number of seed holes that went around on each seed plate during the plot which corresponds to the number of seeds planted. If all the values are displayed correctly 614 the operator may select plant mode 616.

Figure 62:
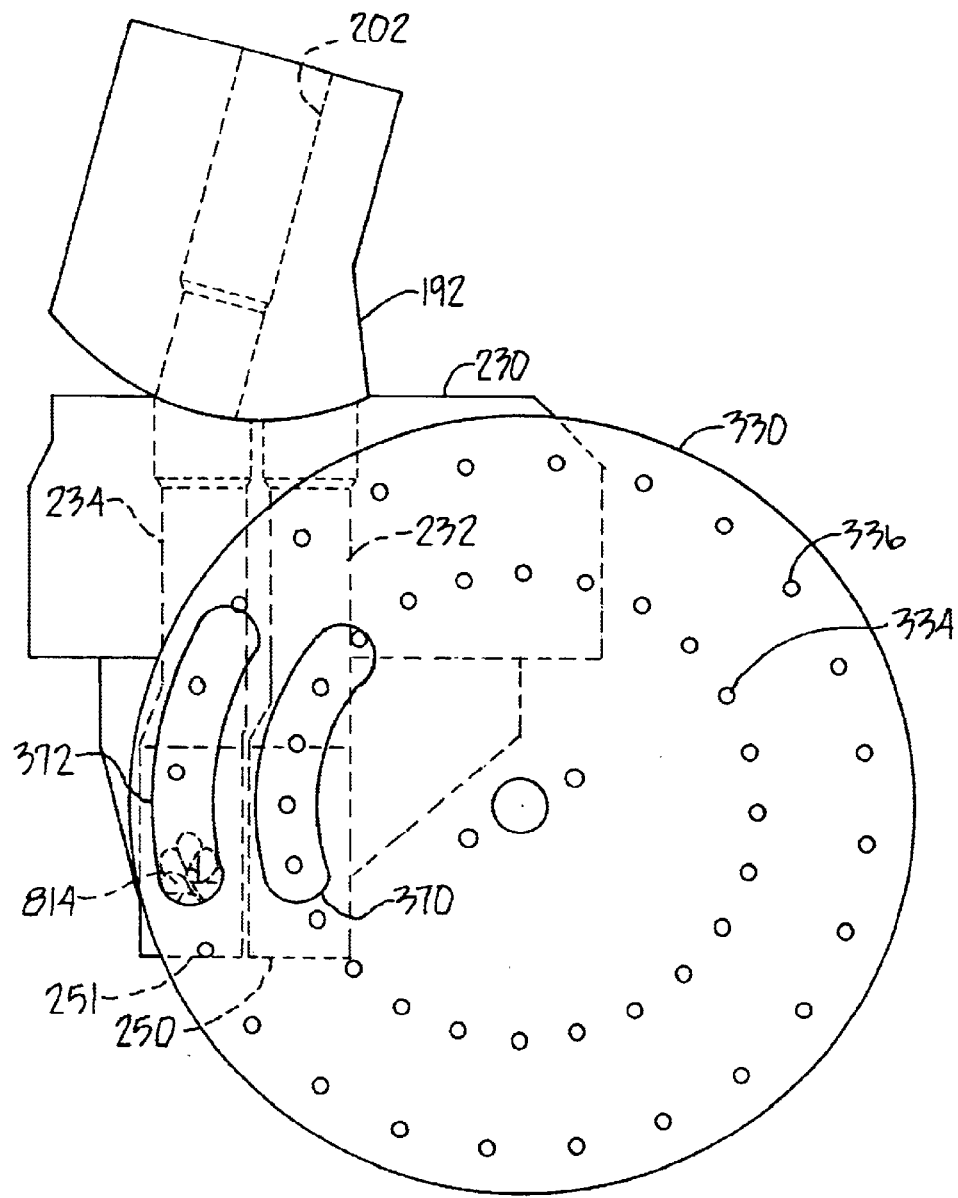
FIG. 62 illustrates the position of the seed metering unit before the first plot start. For the outer seed ring, the vacuum cutoff shoe is closed, the seed sump is closed and the seed is in the sump. For the inner ring, the vacuum cutoff shoe is closed, the seed sump is closed, and no seed is in the sump. No seed is on the plate and the diverter is towards the outer ring.

In plant mode 616 after loading the check head cable 802 into the check head 180 at the beginning of each pass down the field, the operator selects reset button 618. Reset button screen 618 also displays whether the planter is on the baseline side of the field 810 or the far side of the field 812. When reset button 618 is pressed, the diverter solenoid 198 is energized to move diverter 192 and align diverter seed tube 202 with outer seed tube 234 in seed tube block 230 and outer seed sump 251 as shown in FIG. 62. Inner and outer vacuum shoe solenoids 380 and 382 are de-energized so that inner and outer vacuum shoes 370 and 372 are pressed against plate 330 to cutoff the vacuum to the inner 334 and outer 336 seed rings within inner 250 and outer 251 seed sumps. Additionally, inner seed sump solenoid 259 and outer seed sump solenoid 261 are de-energized to close seed sumps 250 and 251, respectively. The position of each solenoid is displayed for the operator. If each solenoid is in their correct position, the operator may dump the first packet or lot of seed 814 into the unit and begin to pull the planter forward.

At the baseline side of the field 810, when the first check ball 800 trips check ball switch 184 and the operator has indicated that planting will start at the baseline 624, the system begins monitoring the position of the planter via the encoder 628. Once the plot start position 630 is reached solenoid 382 is energized to open outer vacuum cutoff shoe 372 and seeds 814 are picked up by outer seed holes 336 in seed plate 330. The plot start position is the base line position 810 minus the plate load distance determined in the calibration cycle.

Figure 63:
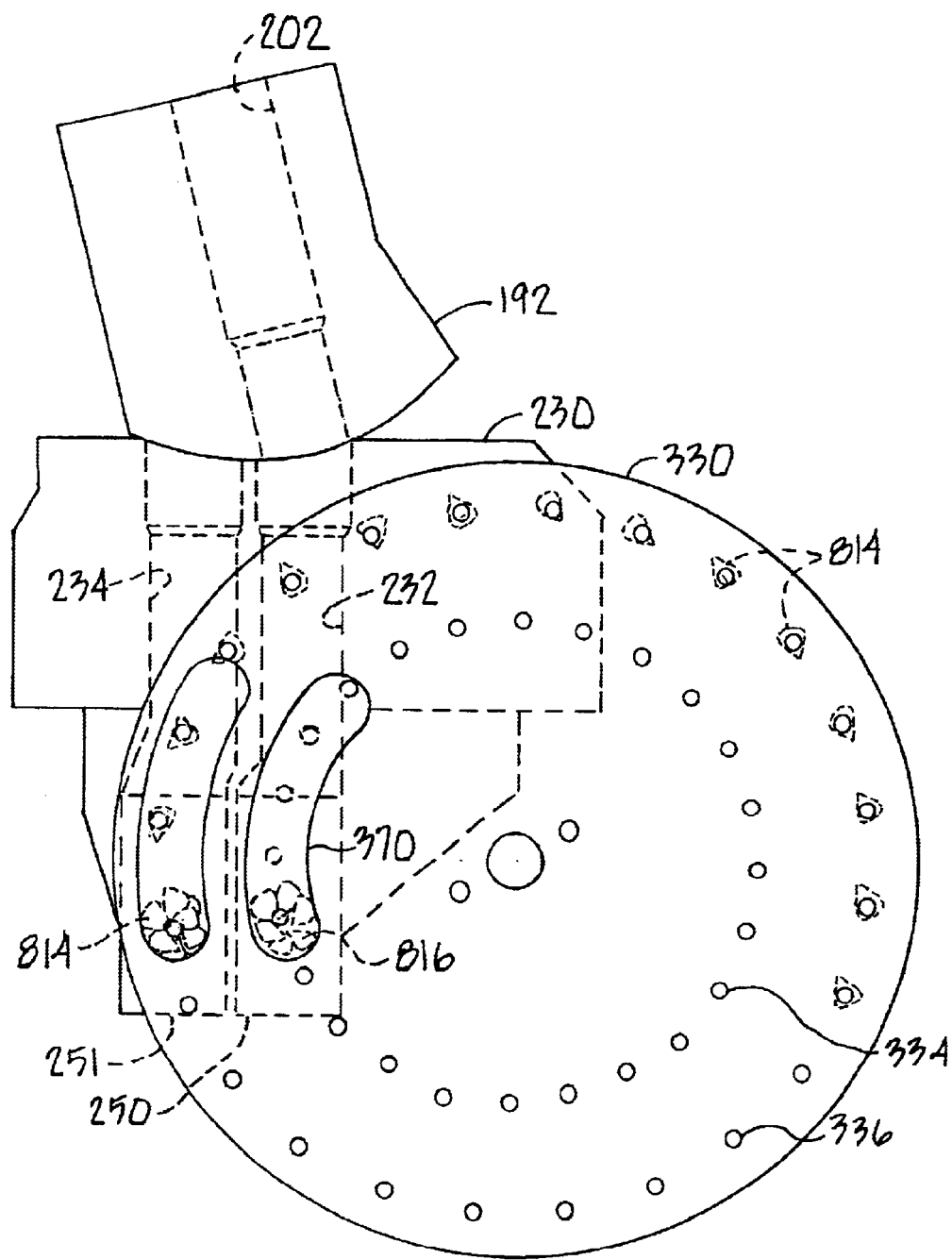
FIG. 63 illustrates the seed metering unit configuration after the first plot start. For the outer seed ring, the vacuum cutoff shoe is open, the seed sump is closed and there is seed in the sump. For the inner seed ring, the vacuum cutoff shoe is closed, the seed sump is closed and seed is in the sump. Seed is on the outer ring of the seed plate and the diverter is pointed toward the inner ring.

When the computer determines that the planter is at the base position 810, diverter solenoid 198 is energized to toggle diverter 192 to the inner row position and align seed tube 202 with inner seed tube 232 of seed tube block 230 and inner sump 250. A dump buzzer or other indicator alerts the operator to dump the next seed lot 816 into the unit. See FIG. 63.

Figure 64:
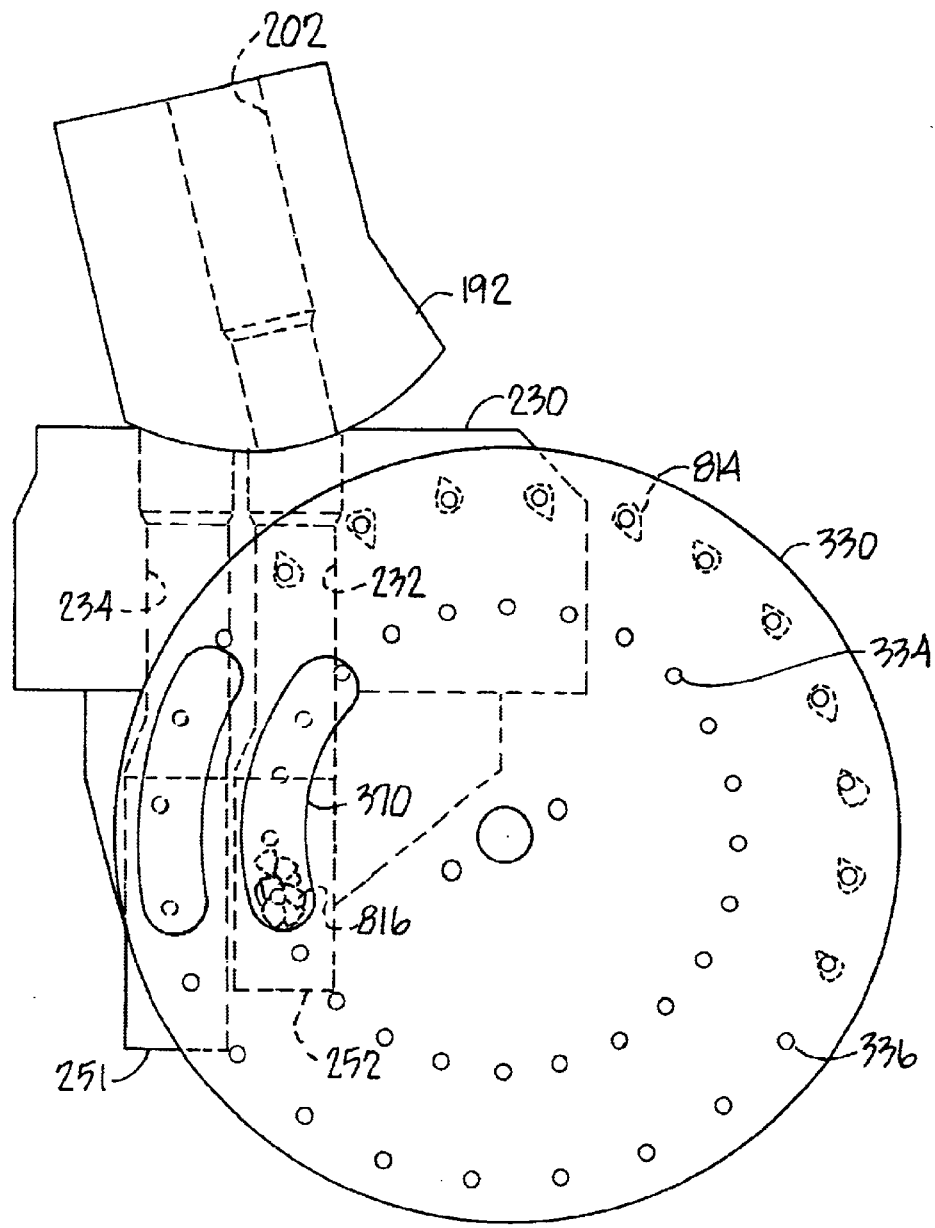
FIG. 64 illustrates the seed metering unit configuration after the first cleanout to allow spacing for the first alley. For the outer seed ring, the vacuum cutoff shoe is open, the seed sump is open and no seed is in the sump. For the inner seed ring, the vacuum cutoff shoe is closed, the seed sump is closed and seed is in the sump. There is seed on the outer seed ring of the seed plate and the diverter is pointed toward the inner seed ring.
Figure 65:
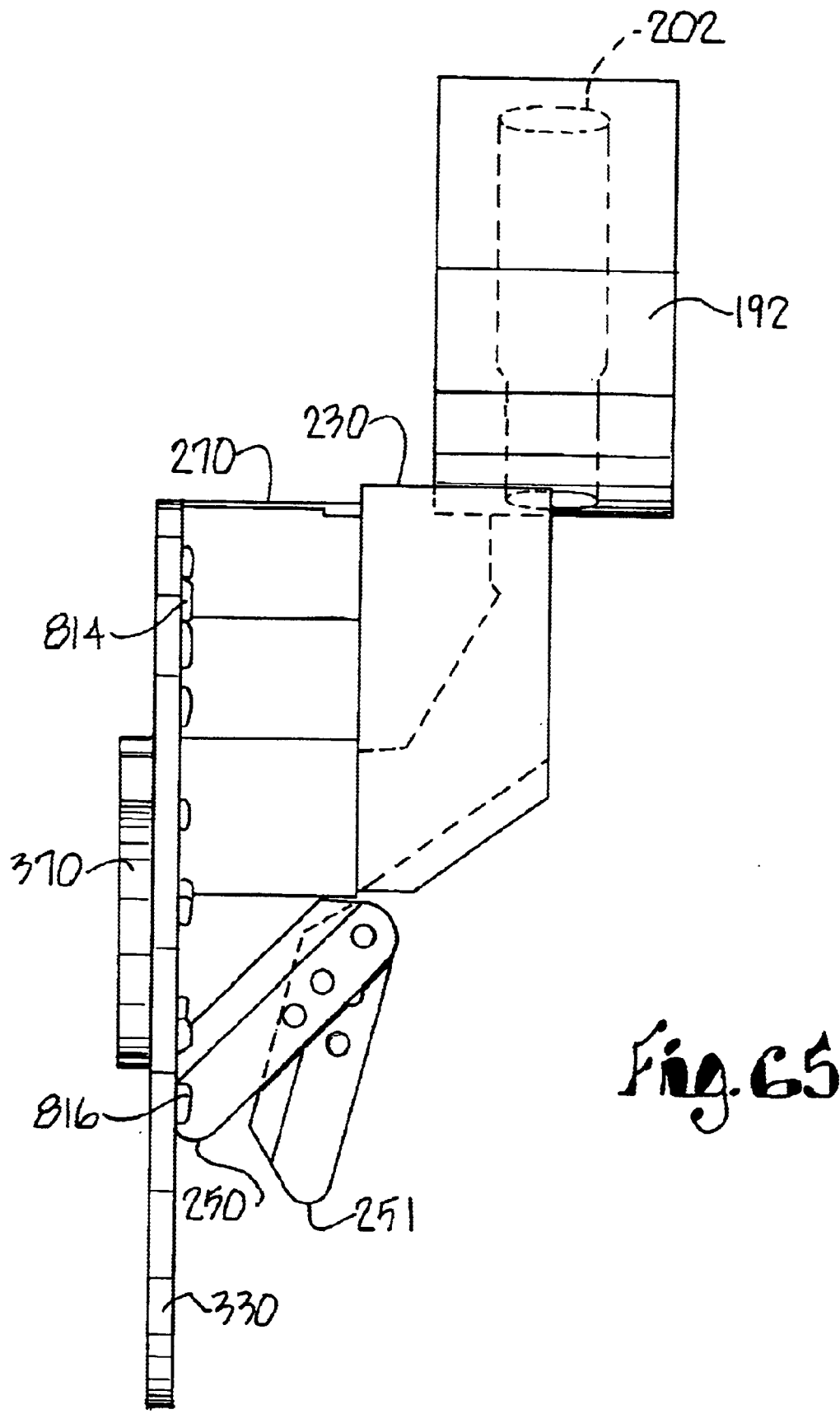
FIG. 65 is a side view the configuration shown in FIG. 64.

The planter's position is monitored 634 until the planter reaches the base line which is the plot start plus the plate load 636. Once the base line 810 is reached, the unit begins counting seeds and cells 638. The system monitors the position 640 of the planter based on the encoder pulses and the calibration factor. When the end of plot is reached 642, outer sump 251 is opened 644 and any remaining seeds in sump 251 are dumped and vacuumed into discard jar 146. See FIGS. 64 and 65. Once all seeds are singulated 650, at the position on seed plate 330 where the last seed hole is clear of the area covered by outer vacuum cutoff shoe 372, the outer vacuum cutoff shoe is closed. Additionally, at the position where the last seed 814 is passed the point on seed plate 330 where all seeds are singulated, sump 251 is closed 652.

Once the distance for sump cleanout and plate load 654 has been traveled by planter 100, the unit stops counting and stores the data for this plot or sends the data out on the RS 232 if required 656.

Figure 66:
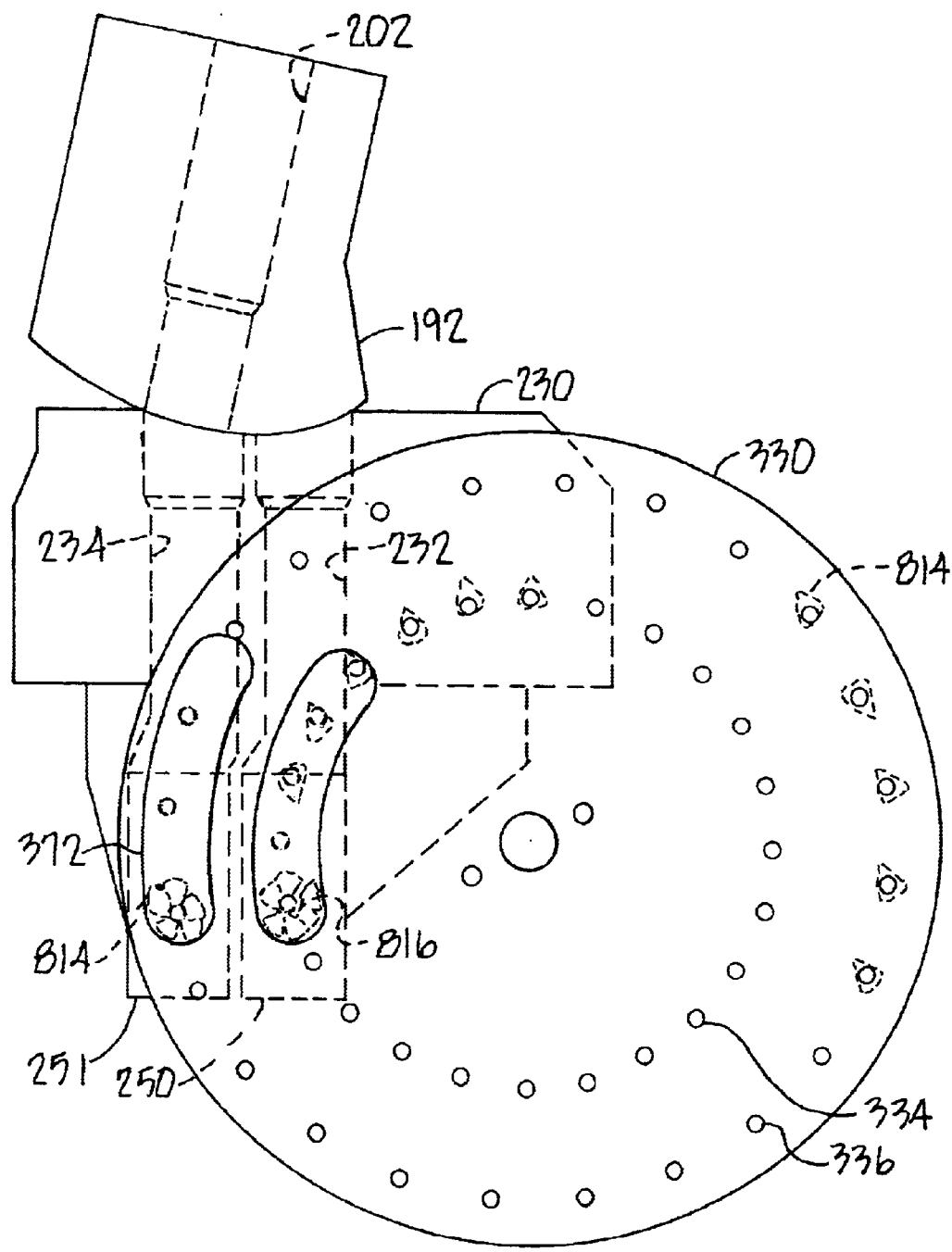
FIG. 66 illustrates the configuration of the seed metering unit at the start of plot 2. For the outer ring, the vacuum cutoff shoe is closed, the seed sump is closed, and there is seed in the sump. For the inner seed ring, the vacuum cutoff shoe is open, the seed sump is closed, and there is seed in the sump. There is seed on the end of the outer seed ring of the seed plate and seed is beginning on the inner ring of the seed plate. The diverter is pointed toward the outer seed ring.

If this is not the end of the pass 658, the system monitors the planter position 660 to determine the start of the next plot 662. Once the next plot start has been reached, the inner vacuum cutoff shoe 370 is opened and seeds 816 are picked up on the inner ring of seed holes 334. At the same time, diverter 192 toggles back to pointing to the outer row of seed holes 336 and the dump buzzer is sounded to alert the operator to dump the next seed lot 814 into the unit. See FIG. 66.

Figure 67:
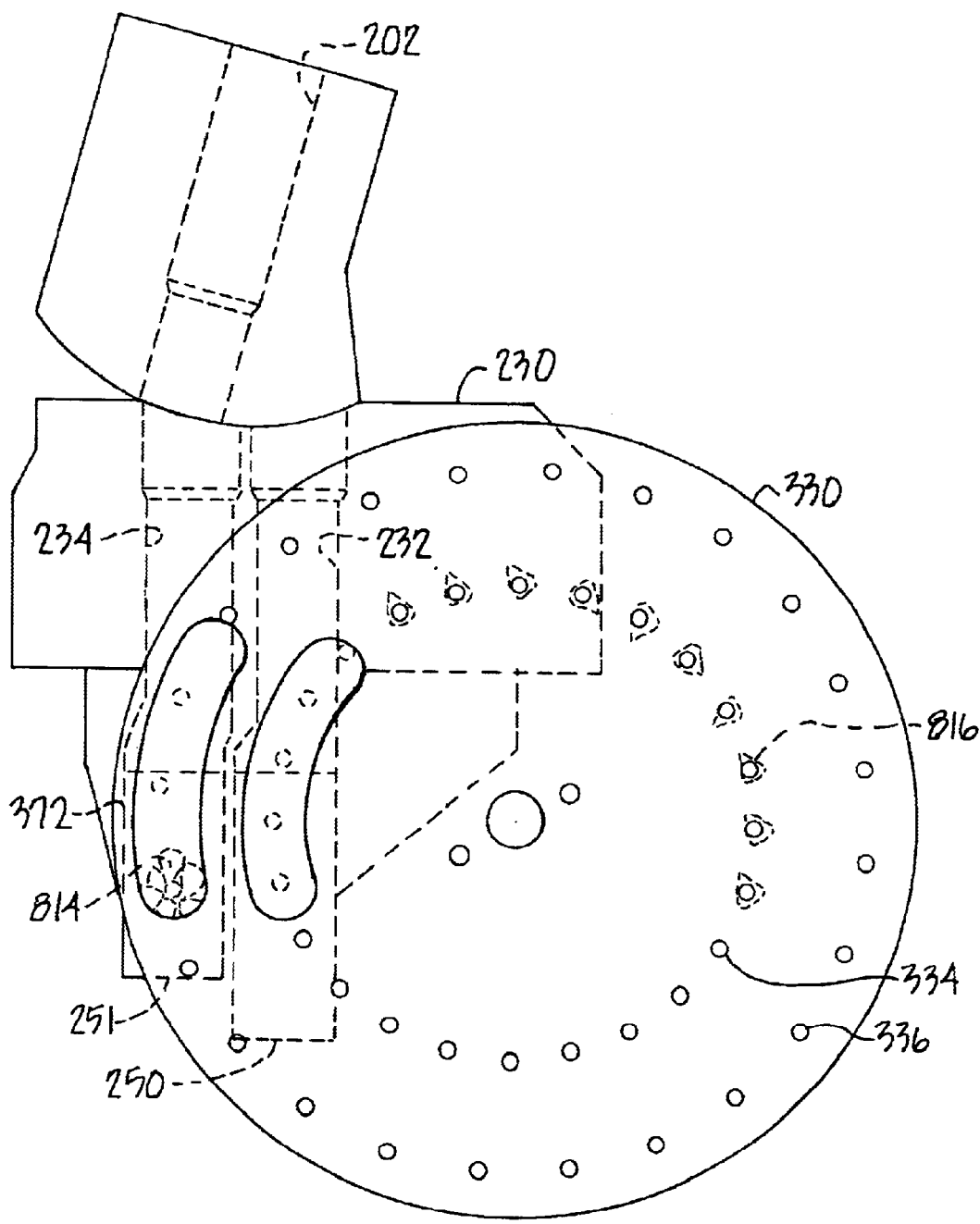
FIG. 67 illustrates the configuration of the seed metering unit at the end of plot 2 to allow spacing for the second alley. For the outer seed ring, the vacuum cutoff shoe is closed, the seed sump is closed and seed is in the sump. For the inner seed ring, the vacuum cutoff shoe is open, the seed sump is closed and no seed is in the sump. There is seed on the inner ring of the plate and the diverter is pointed toward the outer seed ring.
Figure 68:
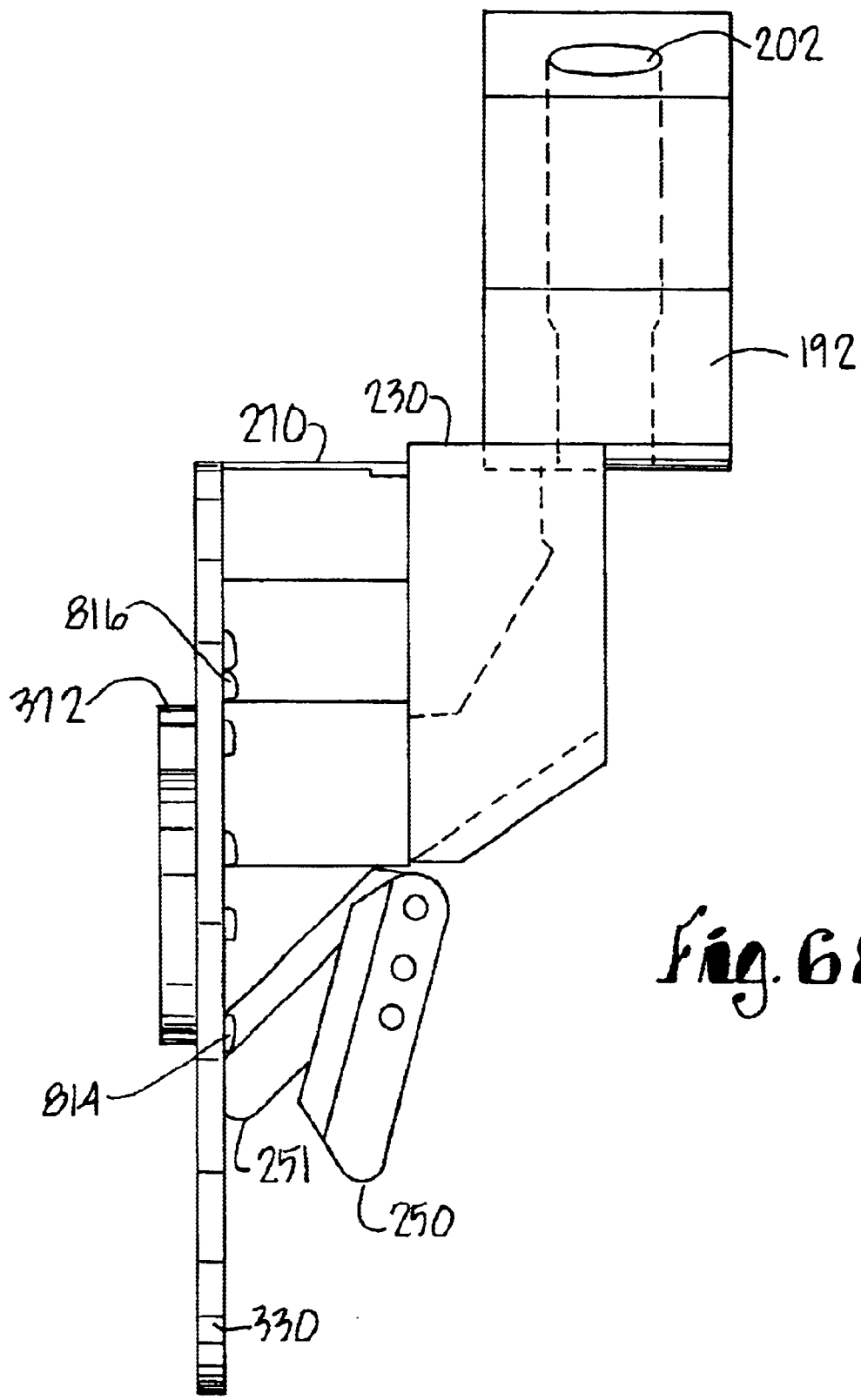
FIG. 68 is a side view of FIG. 67.
Figure 69:
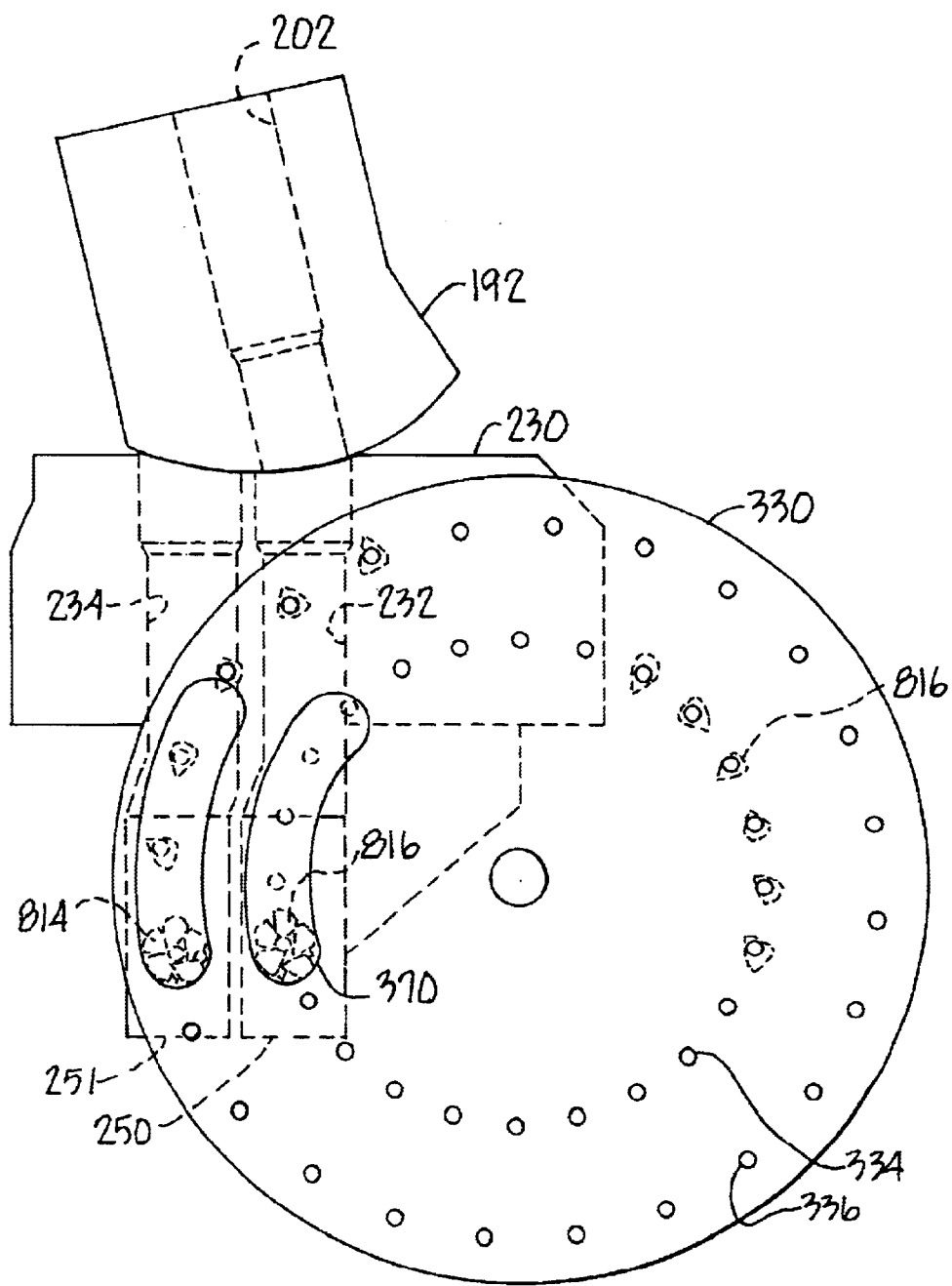
FIG. 69 illustrates the configuration of seed metering unit after the start of plot 3. For the outer seed ring, the vacuum cutoff shoe is open, the seed sump is closed and there is seed in the sump. For the inner seed ring, the vacuum cutoff shoe is closed, the seed sump is closed and there is seed in the sump. There is seed at the end of the inner ring and seed beginning on the outer ring of the seed plate. The diverter is pointed towards the inner seed ring.

Finally, the plot number is increased or incremented 664. The planter position is monitored 666 to determine the start of the next plot 668. The unit starts counting for the inner seed ring for plot 2 when the outer seed ring 336 has dropped the last seed 814. Once the plot start plus plate load position 668 has been reached, the unit begins counting seeds 670 for the inner seed ring 334. The planter position is monitored 672 until the end of plot is reached 674. At this point, inner seed sump 250 is opened 676 to clean out the sump as shown in FIG. 67. Any remaining seeds in the sump are ejected into discard jar 146. At the position on seed plate 330 where the last seed hole 334 is clear of the area covered by the inner vacuum cutoff shoe 370, inner vacuum cutoff shoe 370 is closed. At the distance where the last seed hole 334 on seed plate 330 is past the point where all seeds are singulated 680, inner seed sump 250 is closed 682.

The planter position is continued to be monitored 678 to determine the end of the next plot as calculated by the cleanout and plate load distance 684 on seed plate 330. Once the end of plot has been reached, the unit stops counting and stores the data or sends the data out on the RS 232 if required 686. If this is not the end of the pass 688, the system continues monitoring the position of the planter 690 to determine the plot start 692. When the plot start minus the plate load distance has been reached 692, the outer vacuum shoe 372 is opened and seeds are picked up on the outer ring of seed holes 336. At the same time, the diverter 192 toggles back to pointing to the inner row of seed holes 334 and the dump buzzer is sounded to alert the operator to dump the next seed lot 618 into the unit. Finally the plot number is incremented 694. This process is repeated 696 down the field to plant each plot 803 and leaves the correct alley 806 between successive plots. As each plot is planted, the plot time is recorded and displayed, the number of seeds that passed through the sump is displayed and recorded, and the actual number of seeds in each row is displayed and recorded. The seeds for each plot are counted from the position where the first seed picked up reaches the drop off point to the point where the last seed reaches the drop off point plus an amount of time for the seed to fall past the seed sensor.

In the planting mode, error-checking process 706 runs in the background. The PLC compares the state of individual outputs that control solenoid positions to the inputs coming from sensors on the row units showing the actual position of the solenoid. When a disagreement occurs, or error condition is detected 708, an alarm buzzer is sounded 710 and the precise location and nature of the error is displayed to the operator. At this point the user has the option to acknowledge the alarm 712 which resets the enable bit for this condition and disables the alarm 714. Additionally, the user may acknowledge all alarms 716 and clear all error conditions 718.

The vacuum level at each metering unit is also monitored, as is the input power supply voltage. This air checking function is disabled 704 and 698 in FIGS. 57 and 58, such as at the end of the field when the tractor may be idled down and the planter is being turned around 702. This is to prevent nuisance error reporting.

Additionally, another background process to monitor the planter position 720 monitors check head signal 722 to calculate the planter's actual position or location 724 by the button 800 count and button spacing 808 on cable 802. The planter's actual position is compared to the calculated encoder position 726 and a position correction factor is calculated along with a new calibration factor 728. In this way, the current position is corrected every time a known position is reached to keep the accuracy high.

When the return trip at the far side 812 of the field is started, the PLC calculates an offset. This offset is to account for the possibility that the known position indicator will not be in the correct position to start the first plot. By adding the offset, the planter is able to place the first seed of the return pass down the field even with the last seed from the previous pass. This also ensures that the alleys line up across the field when all plots are planted.

Having thus described the invention, what is claimed as new and desired to be secured by Letters Patent is:

1. A metering unit for a seed planter comprising:

a generally circular seed plate having an axis of rotation, first and second sides and inner and outer seed systems arranged in concentric rings about said axis of rotation; said seed systems each having a plurality of apertures extending from said first side to said second side through said seed plate, each for receiving and carrying a seed;

a divider vane in communication with said first side of said seed plate and presenting inner and outer arcuate channels corresponding to said inner and outer seed systems for separating said seed systems;

inner and outer seed sumps in communication with said first side of said seed plate within said inner and outer channels for retaining seed in communication with said first side of said seed plate; and a diverter tube for selectively delivering seed to said seed sumps.

2. The metering unit as claimed in claim 1 further comprising:
- a vacuum seal in communication with said second side of said seed plate, having inner and outer arcuate chambers corresponding to a portion of said inner and outer seed systems; and
- inner and outer vacuum cutoff shoes selectively in communication with said second side of said seed plate opposite said inner and outer seed sumps and within said inner and outer vacuum chambers to selectively control application of a vacuum to said inner and outer seed systems.

3. The metering unit as claimed in claim 1 wherein said apertures are countersunk from said second side of said seed plate.

4. The metering unit as claimed in claim 1 further comprising inner and outer singulators adjustably mounted within said inner and outer channels for singulating seed on said inner and outer seed systems.

* * * * *